(12) United States Patent
Ashley et al.

(10) Patent No.: US 10,547,036 B1
(45) Date of Patent: Jan. 28, 2020

(54) POWER INTERFACE ENSEMBLE AND MODULE FOR MOBILE CONSUMER ELECTRONICS

(71) Applicant: M-Edge International Corporation, Hanover, MD (US)

(72) Inventors: Adam R. Ashley, Crownsville, MD (US); Joshua B. King, Linthicum Heights, MD (US); Serge H. Seferian, Chicago, IL (US)

(73) Assignee: M-Edge International Corporation, Hanover, MD (US)

(*) Notice: Subject to any disclaimer, the term of this patent is extended or adjusted under 35 U.S.C. 154(b) by 54 days.

(21) Appl. No.: 15/994,931

(22) Filed: May 31, 2018

(51) Int. Cl.
*H02J 7/00* (2006.01)
*H01M 2/10* (2006.01)
*H01M 10/48* (2006.01)
*A45F 3/00* (2006.01)
*A45F 3/04* (2006.01)

(52) U.S. Cl.
CPC ....... *H01M 2/1022* (2013.01); *H01M 2/1011* (2013.01); *H01M 10/488* (2013.01); *H02J 7/0044* (2013.01); *H02J 7/0047* (2013.01); *H02J 7/0054* (2013.01); *A45F 3/04* (2013.01); *A45F 2003/003* (2013.01); *H01M 2220/30* (2013.01)

(58) Field of Classification Search
CPC ....... H02J 7/0044; H02J 7/0047; H02J 7/0054
See application file for complete search history.

(56) References Cited

U.S. PATENT DOCUMENTS

| 8,593,108 | B2 | 11/2013 | Ferber et al. | |
| 2009/0224722 | A1 | 9/2009 | Causey | |
| 2011/0006729 | A1 | 1/2011 | Matthias | |
| 2014/0159640 | A1* | 6/2014 | Yoshikawa | H02J 7/0044 320/103 |
| 2014/0274204 | A1 | 9/2014 | Williams | |
| 2015/0326044 | A1* | 11/2015 | Ashley | H02J 7/0054 320/103 |
| 2016/0322844 | A1* | 11/2016 | Pickens | H02J 7/0044 |

* cited by examiner

*Primary Examiner* — Stewart A Fraser
(74) *Attorney, Agent, or Firm* — Christopher J. Scott

(57) ABSTRACT

A power interface ensemble includes an article-carrying tool exemplified by a bag or similar other carrying case having an interface opening formed in an exterior surface plane thereof. A power source or battery is disposed within the bag or carrying case, and a particularly configured power interface module is adapted to be electrically coupled to the battery or power source. The power interface module may include an interface input port for connecting to an external power source and an interface output port for connecting to an electronic device. The power interface module is positioned at the interface opening of the article-carrying tool or bag such that the input port and the output port are accessible from an exterior of the bag. The power interface module is particularly contoured externally for protecting the input and output ports and is particularly contoured internally for directing electrical connectivity to the power source.

20 Claims, 32 Drawing Sheets

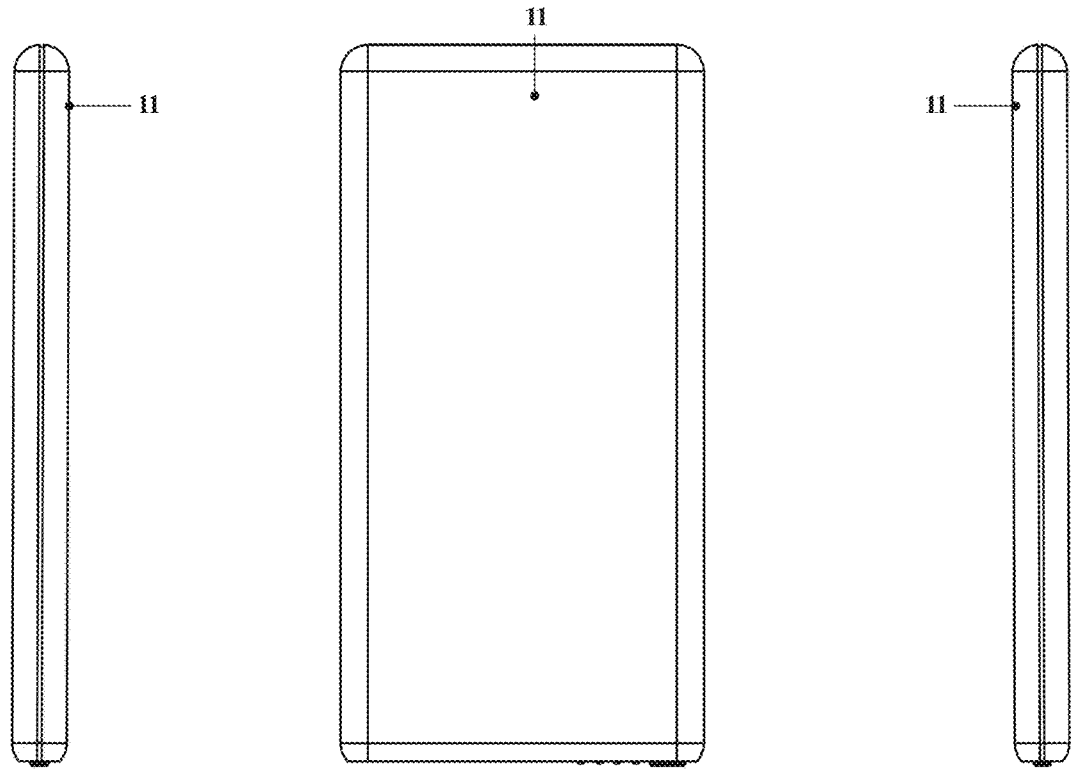
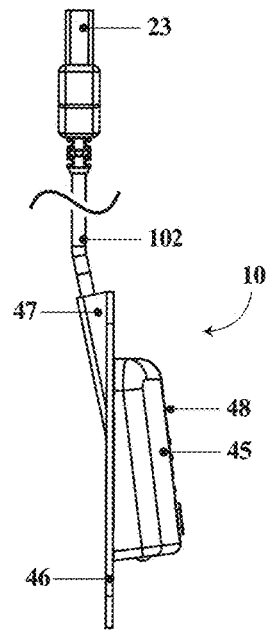
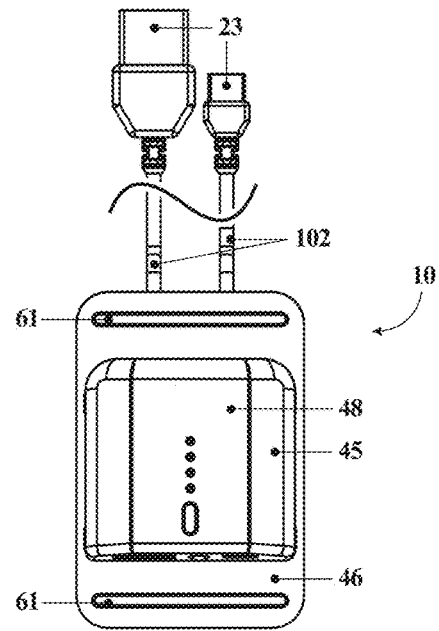
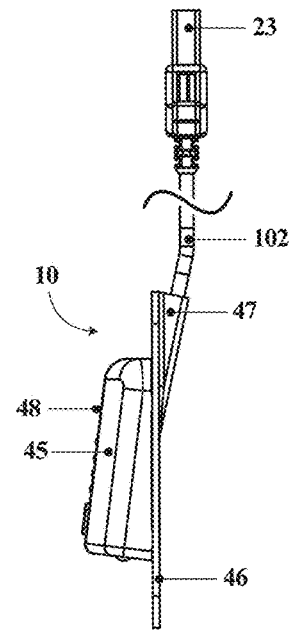
FIG. 19A      FIG. 19B      FIG. 19C

US 10,547,036 B1

POWER INTERFACE ENSEMBLE AND MODULE FOR MOBILE CONSUMER ELECTRONICS

PRIOR HISTORY

This application generally relates to and builds upon U.S. patent application Ser. No. 14/704,601 filed in the United States Patent and Trademark Office on 5 May 2015, now abandoned.

FIELD OF THE INVENTION

The present invention generally relates to a charging system for electronic devices incorporated into a bag or other carrying case. More particularly, the present invention relates to an interface apparatus that may be used in combination with a number of peripheral devices as incorporated into a bag or other carrying case for enabling users thereof to readily recharge electronic devices via the bag or other carrying case ensemble.

BACKGROUND OF THE INVENTION

Electronic devices have become smaller and more portable, and bags, luggage, cases, and other products have been provided to allow users to more conveniently carry their devices. Bag ensembles have been provided comprising both a power source and corresponding device-charging interface on the inside of the bag allowing users to charge their devices only when the devices are positioned inside the bag.

In order to charge their electronic devices with such bag ensembles, users are required to open the bag ensemble to access the power source and its corresponding interface to plug in their electronic devices. This process renders use of the electronic device while charging more difficult. Further, ensembles of this type are inconvenient for users at least insofar as the bag ensemble very often requires removal from the user's person in order to open the bag ensemble for enabling power source and interface access.

In this last regard, the reader may consider U.S. Pat. No. 8,593,108 ('108 patent), issued to Ferber, et al., which discloses a Portable Charging System. The '108 patent describes a preferred portable charging system including a bag configured to receive an electronic device, a battery, a docking station, a charging apparatus and a cord. An alternative portable system according to Ferber, et al., includes a bag, a charging system, and a cord for charging an electronic device. Referencing FIG. 4 of the '108 patent, it will be seen that the bag requires the user to open the bag so as to enable access to the battery charging components, including a battery cell for storing energy and an electrical contact for transmitting electricity therefrom.

US Patent Application Publication No. 2009/0224722 ('722 Publication), authored by Causey. The '722 Publication discloses a Purse Having a Power Recharger Built Therein, and describes a solar-powered battery charger incorporated into a purse with the solar cells being located in the strap of the purse and a charger cord being electrically connected to the solar cells and located to attach to an item to be charged which is located inside the purse. The '722 Publication provides a charger plug, external to a purse compartment, but said to interface with a device for recharging same as stored within the purse compartment. Such an arrangement provides for inconvenience as the user is unable to use the device as stored within the purse compartment while being charged.

US Patent Application Publication No. 2011/0006729 ('729 Publication), authored by Matthias, et al., discloses a Rechargeable Battery Charging Case. The '729 Publication describes a rechargeable battery charging case including a cordless handheld power tool case, having at least one battery attachment device and a case body. Matthias et al. propose the rechargeable battery charging case has an electrical energy output and a supply unit, which in at least one operating state is connected to the energy output and to the battery attachment device for supplying the energy output. Matthias, et al. depart from the foregoing citations in that they provide for an externally accessible interface, but which interface essentially comprises at least one port and little else.

US Patent Application Publication No. 2014/0274204 ('204 Publication), authored by Williams, et al., discloses a Personal E-Port Apparatus. The '204 Publication describes a so-called e-port apparatus including a portable apparatus such as bag, purse, backpack, etc. with specific portions for protecting, organizing displaying and charging plural electronic devices such as smart phones, book readers, game consoles and tablet computers. Williams, et al. also appear to teach an externally accessible interface, but which interface essentially comprises at least one port and little else.

US Patent Application Publication No. 2015/0326044, authored by Ashley et al., describes a bag having an interface opening, a battery disposed within the bag, and a battery interface module adapted to be electrically coupled to the battery. The battery interface module has an interface input port for connecting to an external power source and an interface output port for connecting to an electronic device. The battery interface module is disposed within the interface opening of the bag such that the input port and the output port are accessible from an exterior of the bag. The ports appear to extend orthogonally relative to the plane of the bag in which the interface extends.

It will thus be seen that the prior art thus perceives a need for a power interface ensemble for enabling a user to selectively charge an electronic device thereby while on the go, and which power interface ensemble comprises an article-carrying tool as exemplified by a backpack or similar other carrying case outfitted with a uniquely configured power interface module and optional internal power source for enhancing the user's ability to recharge his or her device while on the go. More particularly, the prior art perceives a need for an article carrying tool comprises an interface opening formed in an exterior tool plane of the article carrying tool into which opening is received the power interface module particularly constructed for enhancing power delivery to the user's device from a separate power source as summarized in more detail hereinafter.

SUMMARY OF THE INVENTION

In a basic embodiment, the invention provides a power interface ensemble including a an article-carrying tool exemplified by a bag or backpack that includes an interface opening, a battery or power source disposed within the bag, and a power interface module particularly adapted to be electrically coupled to the battery or power source. The power interface module may preferably comprise an interface input port for connecting to an external power source and an interface output port for connecting to an electronic device. The power interface module is disposed within the interface opening of the article-carrying tool such that the input port and the output port are readily accessible from an exterior of the article-carrying tool.

The present invention may be said to more particularly provide a power interface ensemble for enabling a user to selectively charge an electronic device. The power interface ensemble according to the present invention may preferably comprise an article-carrying tool, an internal power source, and a power interface module. The article carrying tool preferably comprises an interface opening formed in an exterior tool plane of the article carrying tool. The internal power source is preferably disposed within the article-carrying tool in an inconspicuous location but in read communication with the power interface module.

The power interface module is adapted to be electrically coupled to the internal power source, and preferably comprises a tool-exterior module portion and a tool-interior module portion. The tool-exterior module portion preferably comprises a first exterior end, a second exterior end opposite the first exterior end, and a port shroud extending from the first exterior end to the second exterior end. The tool-interior module portion preferably comprises a planar tool-interface portion and at least one coupling shroud.

The tool-exterior portion is preferably sized and shaped or dimensioned for receipt in the interface opening and is attachable to the planar tool-interface portion such that the planar tool-interface portion and the exterior tool plane extend in parallel planes in juxtaposition relative to one another. The port shroud thus extends outwardly relative to the exterior tool plane, and the coupling shroud thus extends inwardly relative to the planar tool-interface portion.

The first exterior end preferably comprises at least one interface output port for enabling connectivity to the user's electronic device. In this regard, the interface output port is in electrical communication with the coupling shroud, which coupling shroud is in electrical communication with the internal power source for communicating power from the internal power source to the interface output port for enabling the user to selectively charge the user's electronic device via the interface output port.

The port shroud preferably comprises certain outer port shroud surfacing that extends in at least one, but preferably several outer shroud planes, which outer shroud planes extend obliquely relative to the exterior tool plane of the article-carrying tool from the second exterior end to the first exterior end. The second exterior end and the outer shroud planes preferably meet at a radiused formation, which radiused formation preferably further extends peripherally toward the first exterior end.

The first exterior end preferably extends in a first port plane, which first port plane preferably extends obliquely relative to the exterior tool plane of the article-carrying tool exemplified by a bag or backpack. The exterior tool plane of the article-carrying tool may be otherwise described as the primary shell or surfacing of the bag or backpack, and is typically formed of a suitable fabric or similar other materials. The second exterior end preferably extends in a second port plane, which second port plane is orthogonal to the exterior tool plane.

The coupling shroud preferably comprises inner coupling shroud surfacing, which inner coupling shroud surfacing comprises an inner shroud plane extending obliquely relative to the tool-interface portion of the tool-interior module portion. The inner shroud plane and the outer shroud plane are preferably non-parallel and provide differing primary functionality. The outer shroud plane basically functions to direct matter away from the first exterior end much in the same manner as a structural awning.

The inner shroud plane basically functions to enhance directed electrical communication between the interface output port and the power source internally relative to the article-carrying tool by obliquely fixing or directing conductive material from the power interface module via the formation of the coupling shroud. Despite differing angles relative to the planar exterior tool plane and tool-interface portion, the inner shroud plane and the interface output port are configured for enabling linear electrical communication between the interface output port and the coupling shroud.

The first exterior end may further preferably comprise at least one interface input port for connecting to an external power source, including an alternating current source. The power interface module may be preferably electrically coupled to the internal power source by an internal cable, which internal cable is fixed to the power interface module via the coupling shroud. The internal power source may preferably include a power source input port and a power source output port. The internal cable being adapted to connect the power interface module to the internal power source via the power source input port and the power source output port.

A first alternative power interface ensemble according the present invention further enables a user to selectively charge an electronic device wirelessly, and may be provided for independent operation, or used in combination with the preferred power interface ensemble summarized above. The first alternative power interface ensemble according to the present invention may be said to preferably comprise an article-carrying tool, and induction charging device in communication with a power source, and an external-tool device-positioning mechanism.

The article-carrying tool according to the first alternative embodiment preferably comprises an interface construction formed at an interface portion of the article carrying tool. The interface construction preferably comprises a primary tool plane, an internal tool compartment, and the external-tool device-positioning mechanism. The internal compartment and the external-tool device-positioning mechanism are preferably aligned on opposite sides of the primary tool plane.

The induction charger device is preferably received in the internal tool compartment and is in electrical communication with a power source. The internal tool compartment is preferably dimensioned for fixedly positioning the induction charger device adjacent the primary tool plane at a first charging position. The external-tool device-positioning mechanism is variously exemplified for positioning the user's electrical device at a second charging position opposite the first charging position such that the induction charger device and power source together enable the user to selectively charge the electrical device wirelessly via the primary tool plane. In a preferred iteration, the external-tool device-positioning mechanism may be defined by an external tool compartment, which external tool compartment receives and positions the electrical device at the second charging position opposite the first charging position.

The power interface ensembles according to the present application thus provide a convenient system for carrying electronic devices and for charging the devices when they are outside of the article-carrying tool exemplified by a bag or backpack. According to various embodiments, a bag is provided with a battery and an interface that allows the user to charge an electronic device from the exterior of the bag while the battery is stowed safely on the interior of the bag.

The power/charging interface is preferably integrated into the exterior shell plane of the bag.

Bags constructed according to embodiments of the present application allow users to charge one or multiple devices using a battery provided inside the bag via a port accessible on the exterior of the bag without having to access the interior of the bag. Further, the battery may be charged by connecting to an external power source via the port on the exterior of the bag without having to access the interior of the bag. Thus, a user may charge the battery on the inside of the bag through the power interface module without having to open the bag to access the battery. In addition, the user may charge the battery of the electronic device by connecting the device to the battery via the port on the exterior of the bag without having to open the bag to access the battery.

The bag may include a chargeable battery that may be connected to a plurality of power interface modules. The power interface module includes an input port for charging the internal power source from an external power source. The power interface module also includes at least one output port to charge the electronic devices. The power interface module of the article-carrying tool allows connections to the input port and the output port from the outside of the article-carrying tool or bag. The internal power source may be provided with a plurality of battery input ports and a plurality of battery output ports for connecting to the plurality of power interface modules.

The power interface module may further preferably include an indicator which indicates when the electronic device is charging. The indicator may also provide a different indication when the internal power source positioned inside the bag or backpack is charging. Also, the indicator may provide the user with an indication as to the amount of charge remaining in the internal power source.

BRIEF DESCRIPTIONS OF THE DRAWINGS

Other features of the invention will become more evident from a consideration of the following brief descriptions of the illustrations submitted in support of the subject invention:

FIG. 1 is a diagram depicting a first set of exemplary electrical connections according to the present invention showing an electrical outlet, a power interface module, a battery power source, and a user's electrical device with removable connectors between (a) the electrical outlet and power interface module and (b) the user's electrical device and power interface module and a single permanent connector between the power interface module and the battery power source.

FIG. 2 is a diagram depicting a second set of exemplary electrical connections according to the present invention showing an electrical outlet, a power interface module, a battery power source, and a user's electrical device with removable connectors between (a) the electrical outlet and power interface module; (b) the user's electrical device and power interface module and a single coupling connection mechanism between the power interface module and the battery power source.

FIG. 3 is a diagram depicting a second set of exemplary electrical connections according to the present invention showing an electrical outlet, a power interface module, a battery power source, and a user's electrical device with removable connectors between (a) the electrical outlet and power interface module; (b) the user's electrical device and power interface module and a dual coupling connection mechanism between the power interface module and the battery power source.

Figure 5A:
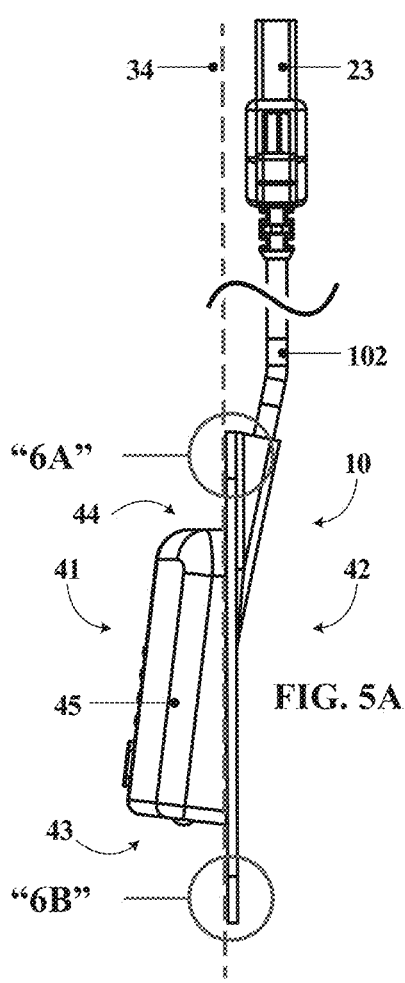
FIG. 5A is a first lateral side view of a power interface module according to the present invention outfitted with a first connector for removably coupling the power interface module to a battery power source.
Figure 5B:
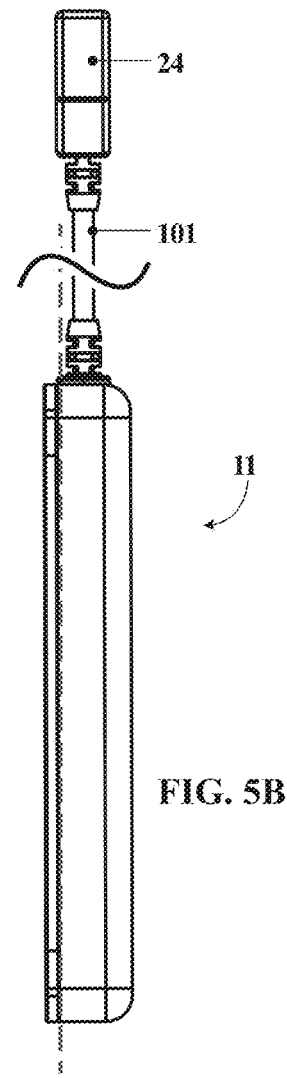
FIG. 5B is a first lateral side view of a first battery power source according to the present invention outfitted with a second connector for removably coupling the first battery power source to the power interface module.
Figure 6A:
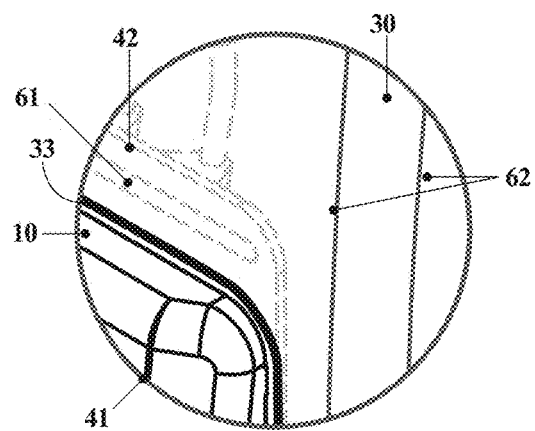

FIG. 6A is a fragmentary sectional view as sectioned, enlarged, and rotated from FIG. 5A to show in greater detail a first end portion of the power interface module attached to a strap portion of the backpack version of the power interface ensemble with exposed portions of the power interface module being depicted in solid black lining and hidden portions of the power interface module being depicted in broken grayscale lining.

Figure 6B:
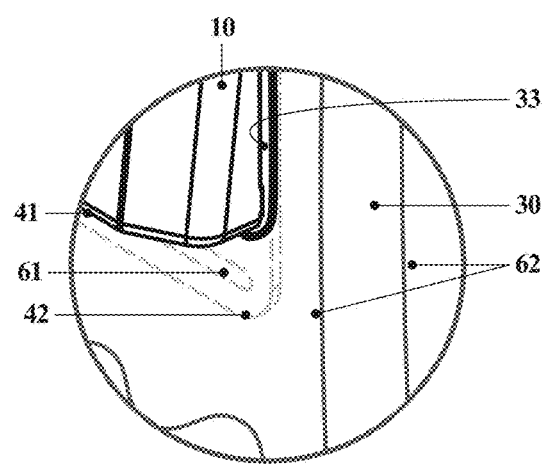

FIG. 6B is a fragmentary sectional view as sectioned, enlarged, and rotated from FIG. 5A to show in greater detail a second end portion of the power interface module attached to the strap portion of the backpack version of the power interface ensemble with exposed portions of the power interface module being depicted in solid black lining and hidden portions of the power interface module being depicted in broken grayscale lining.

Figure 7:
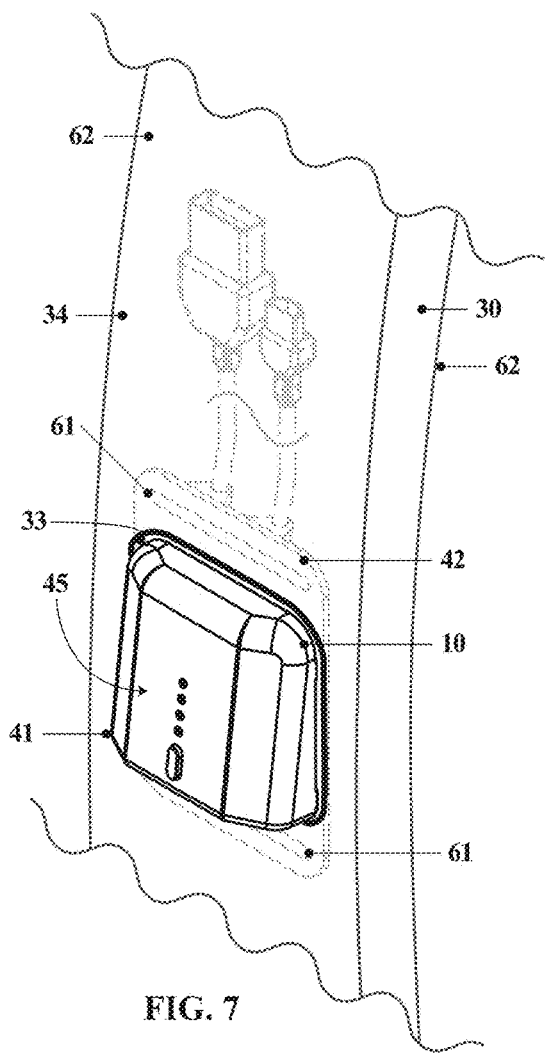

FIG. 7 is a fragmentary, enlarged perspective view of the strap portion of the backpack version of the power interface ensemble according to the present invention enlarged to show in greater detail the power interface module as attached to the strap portion with exposed portions of the power interface module being depicted in solid black lining and hidden portions of the power interface module being depicted in broken grayscale lining.

Figure 8:
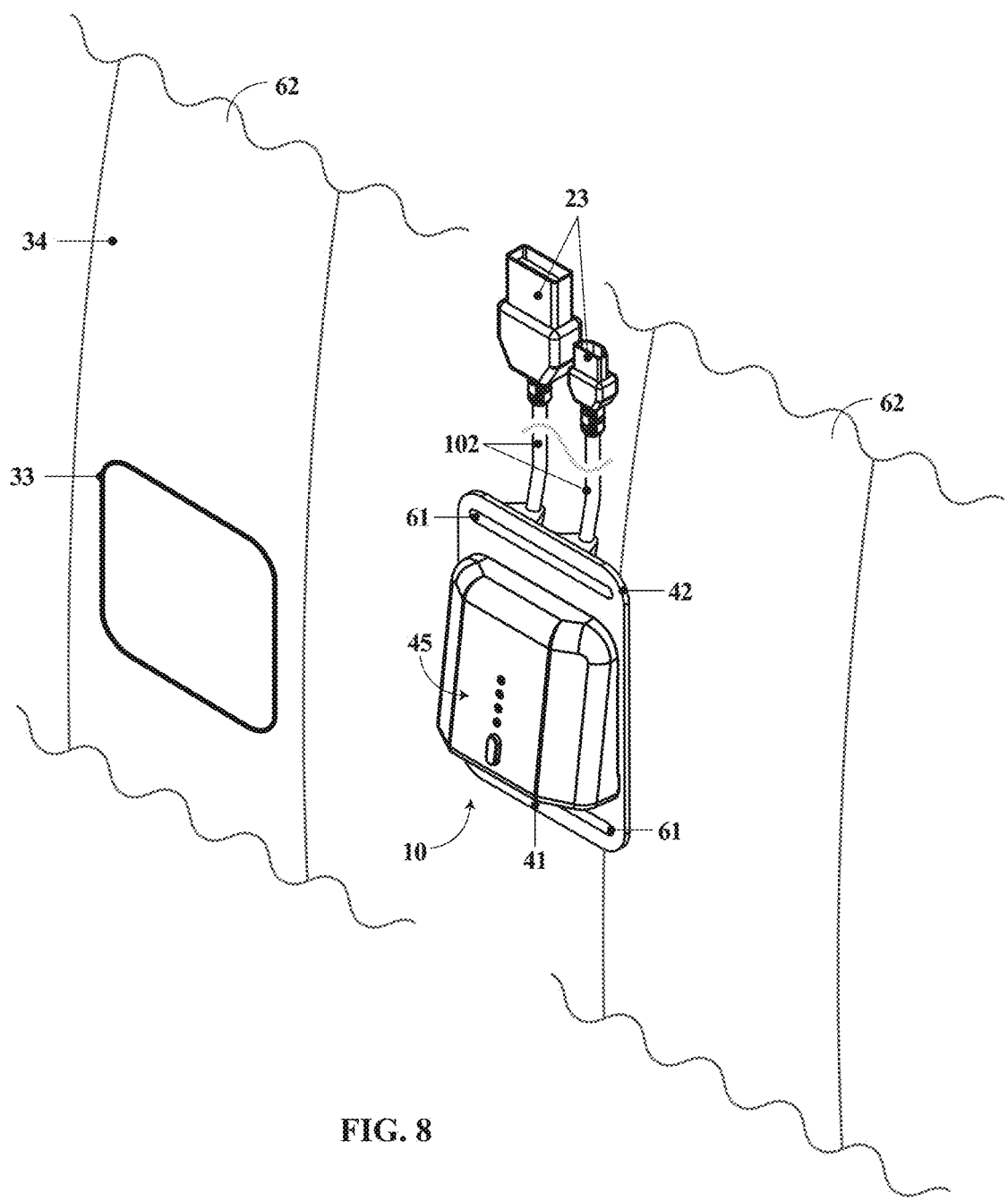

FIG. 8 is a fragmentary, enlarged, exploded perspective view of the strap portion of the backpack version of the power interface ensemble according to the present invention enlarged and exploded to show in greater detail how the power interface module is attached to the strap portion.

Figure 9:
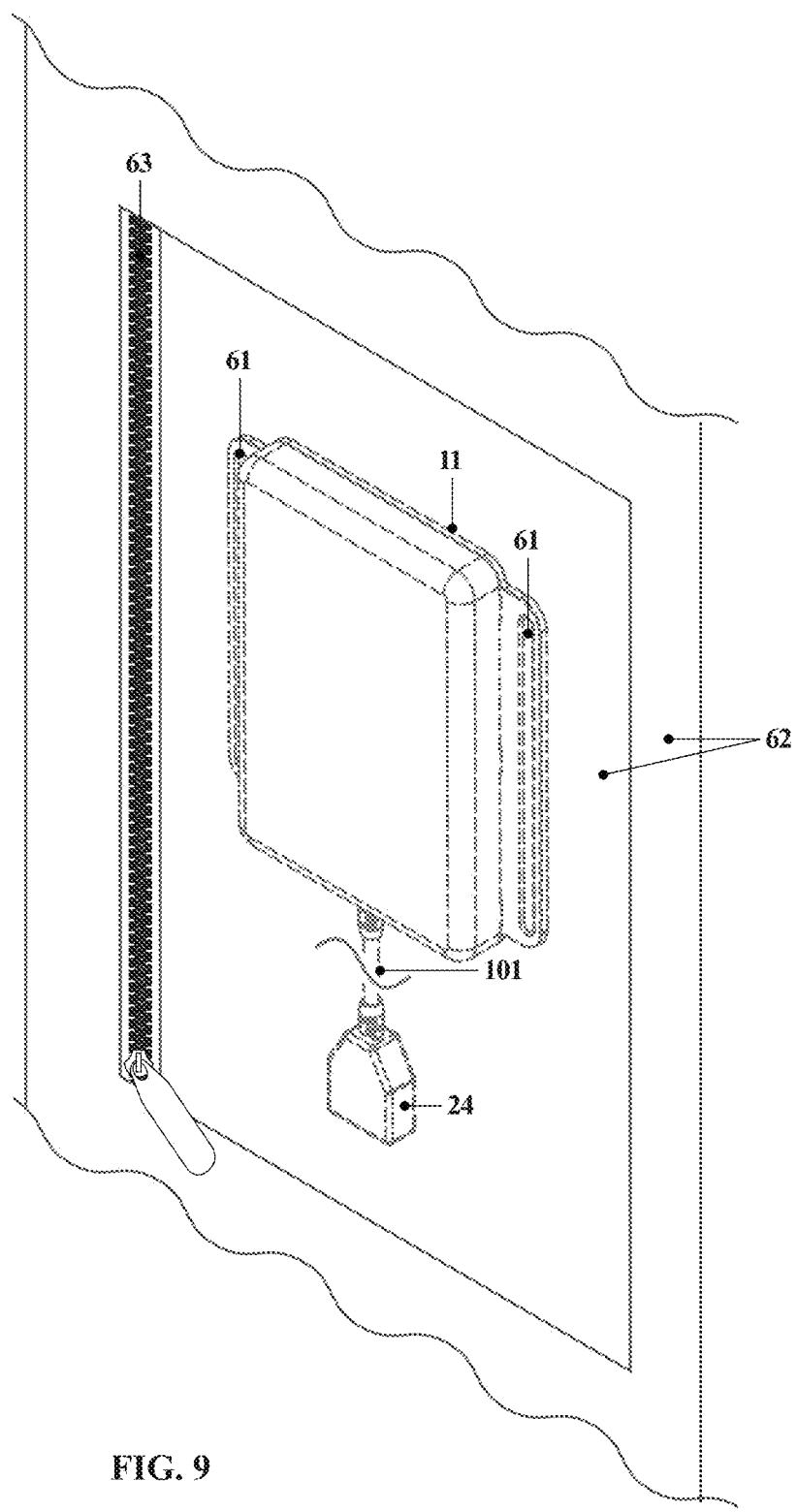

FIG. 9 is a fragmentary, enlarged perspective view of a zippered compartment portion of the backpack version of the power interface ensemble according to the present invention enlarged to show in greater detail a battery power source as received within a zippered compartment of the backpack version of the power interface ensemble.

Figure 10:
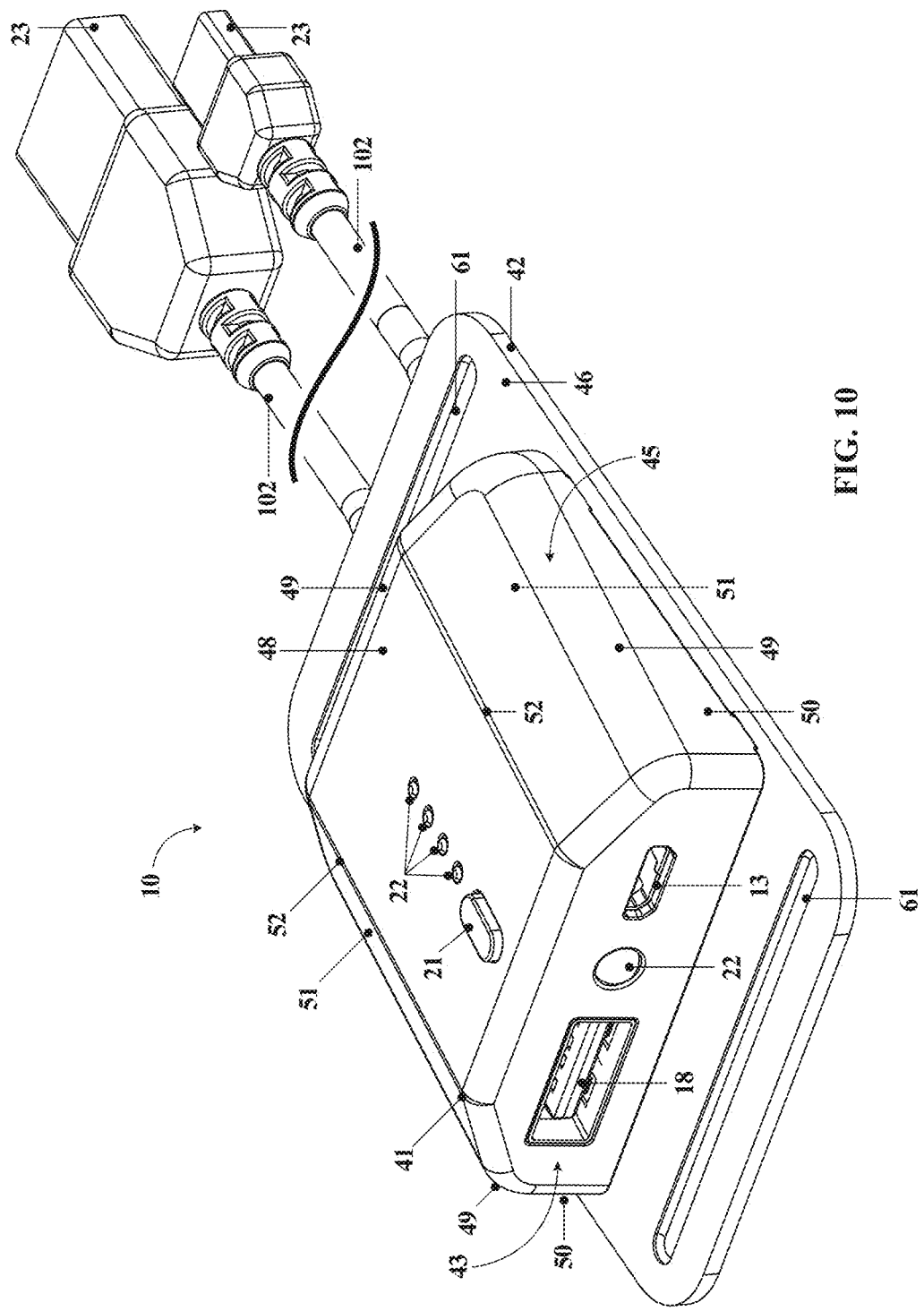

FIG. 10 is an enlarged perspective view of a power interface module according to the present invention showing dual connectors extending from a second end of the power interface module.

Figure 11:
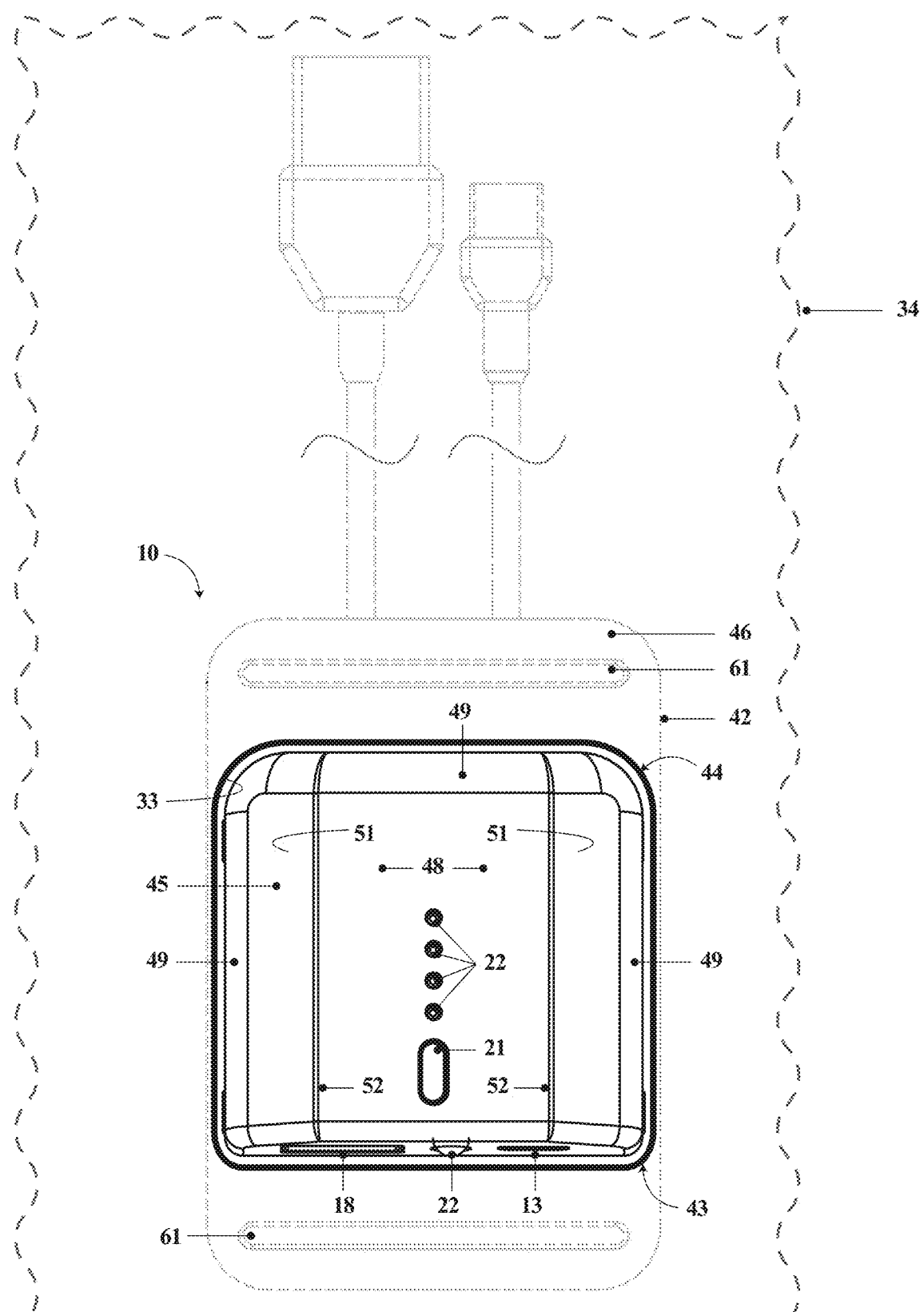

FIG. 11 is a first plan view of a power interface module attached to an exterior tool plane portion of the power interface ensemble with exposed portions of the power interface module being depicted in solid black lining and hidden portions of the power interface module being depicted in broken grayscale lining.

Figure 12:
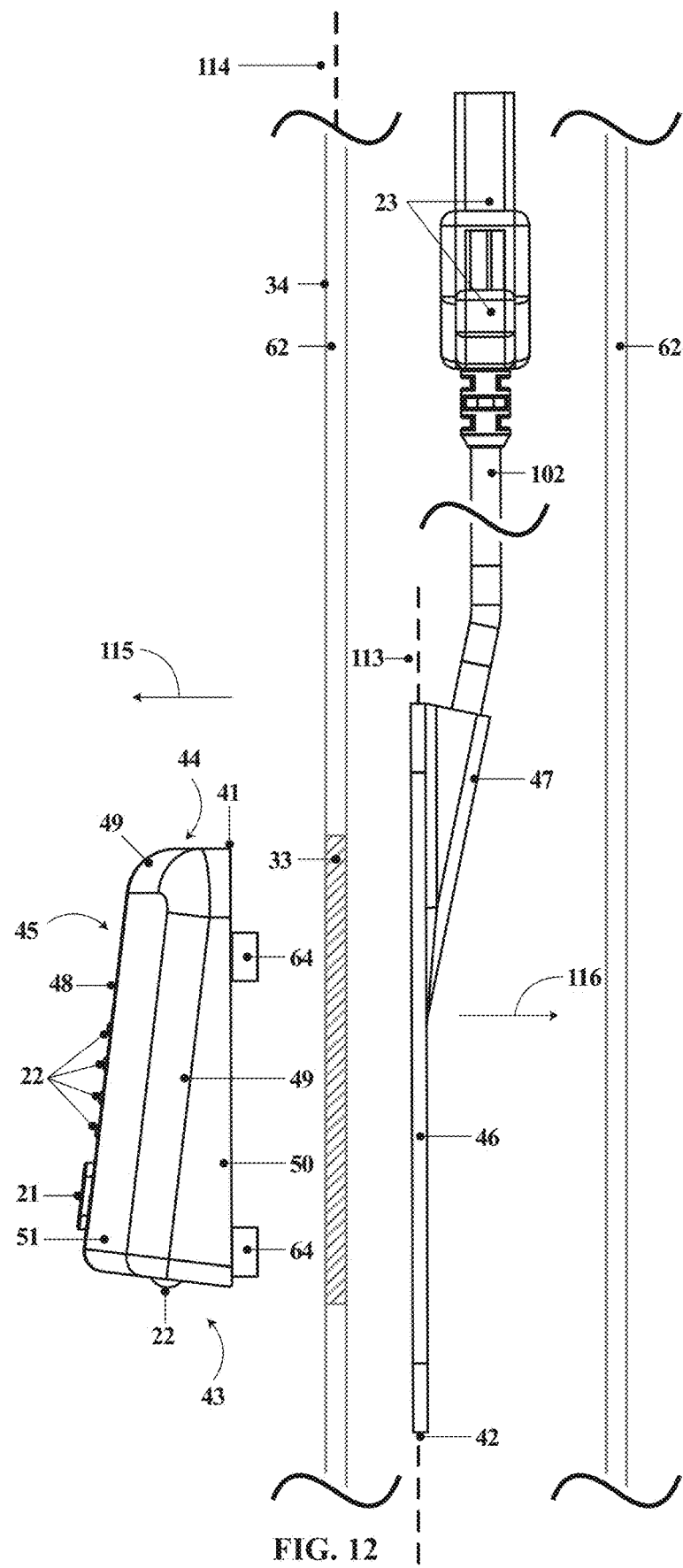

FIG. 12 is an exploded lateral or side view of from left to right, (a) a tool-exterior portion of a power interface module, (b) a planar primary exterior tool material portion of an article-carrying tool having an opening formed therein, (c) a tool-interior portion of a power interface module, and (d) a planar interior tool material portion for compartmentalizing the tool-interior portion of a power interface module between the primary exterior tool material portion and said interior tool material portion.

Figure 12A:
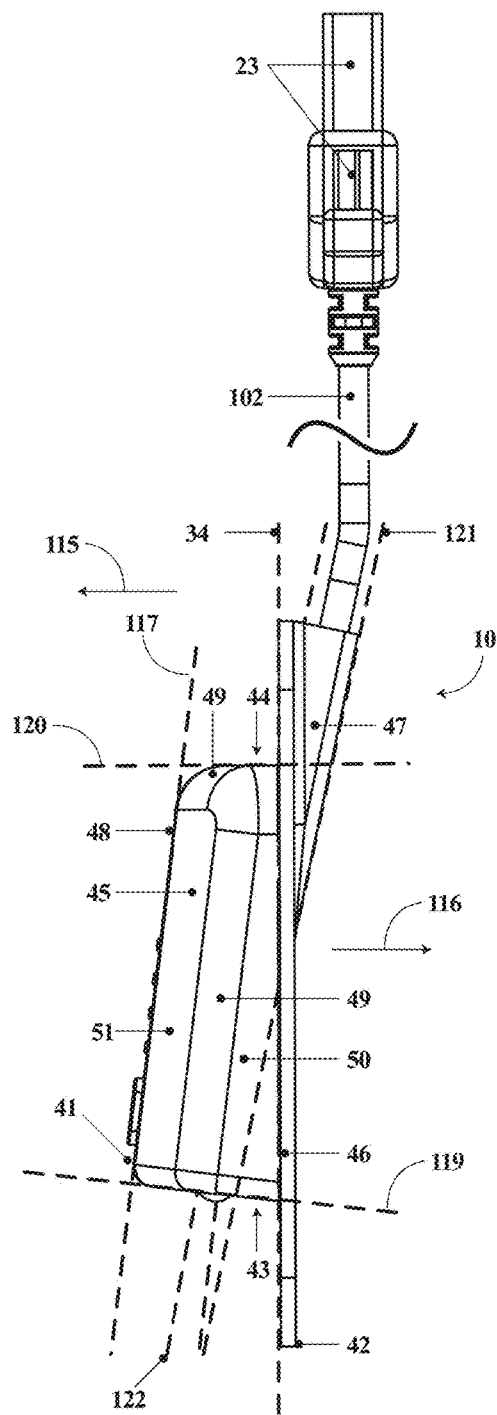

FIG. 12A is a first lateral side view of a power interface module according to the present invention depicting critical angular relationships of certain exterior surfacing thereof.

Figure 12B:
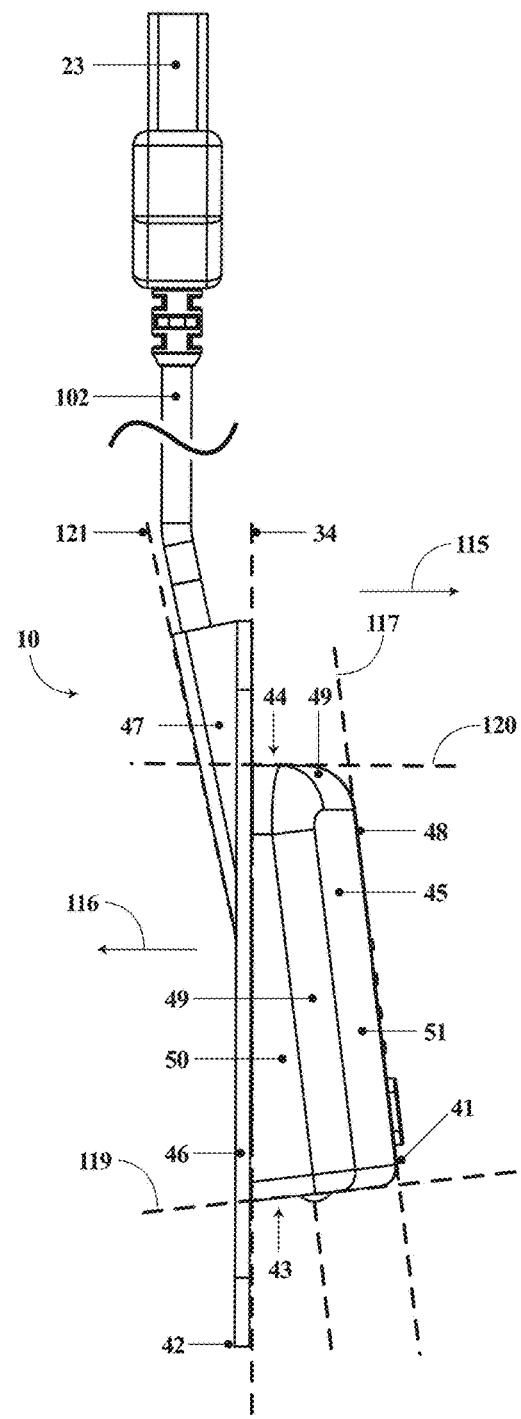

FIG. 12B is a second lateral side view of a power interface module according to the present invention depicting critical angular relationships of certain exterior surfacing thereof.

Figure 13:
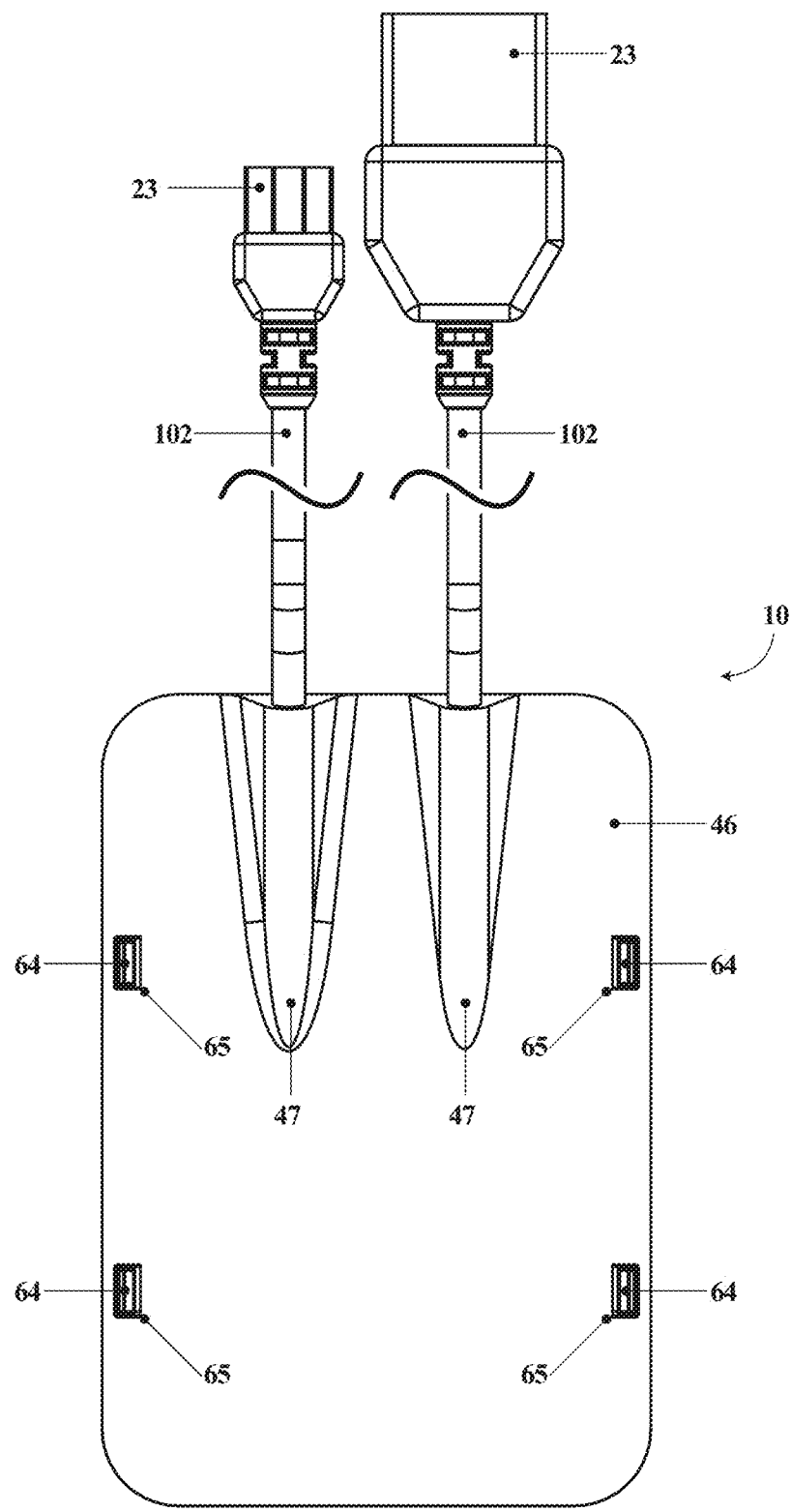

FIG. 13 is a second plan view of internal surfacing a power interface module according to the present invention.

Figure 14:
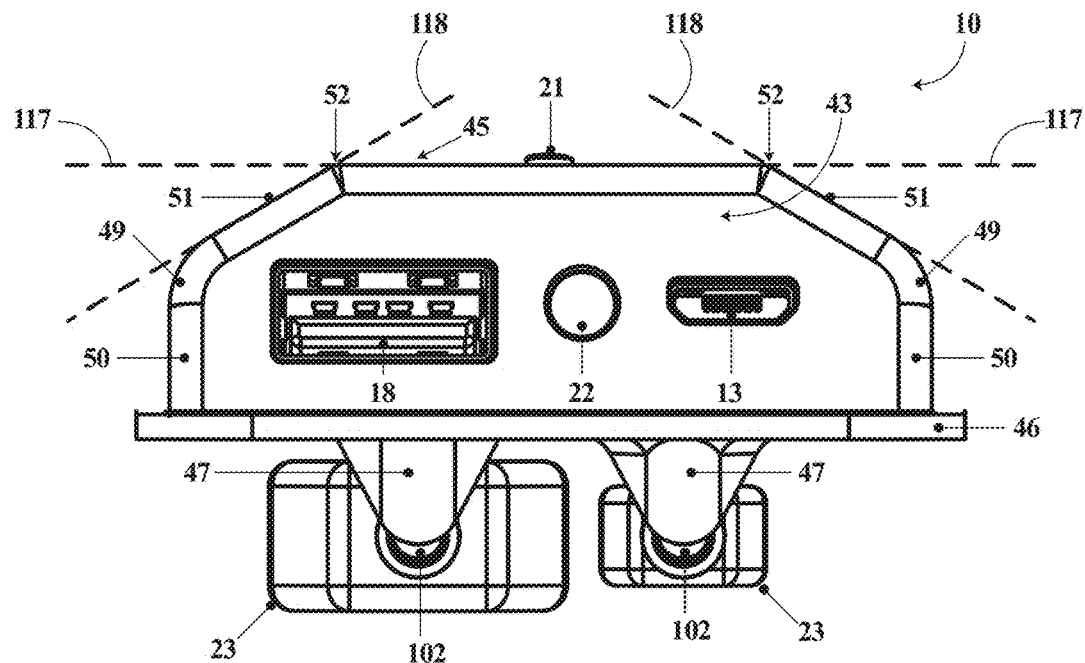

FIG. 14 is a first end view of a power interface module according to the present invention showing power input and output ports at the first end.

Figure 15:
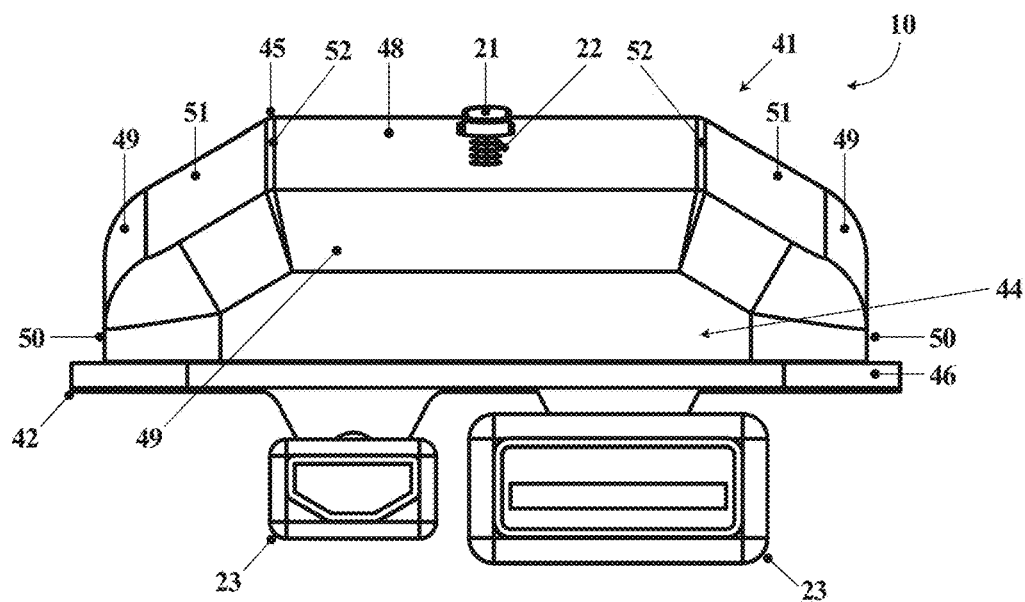

FIG. 15 is a second end view of a power interface module according to the present invention showing upper sloped surfacing of a port shroud portion of the power interface module.

Figure 16:
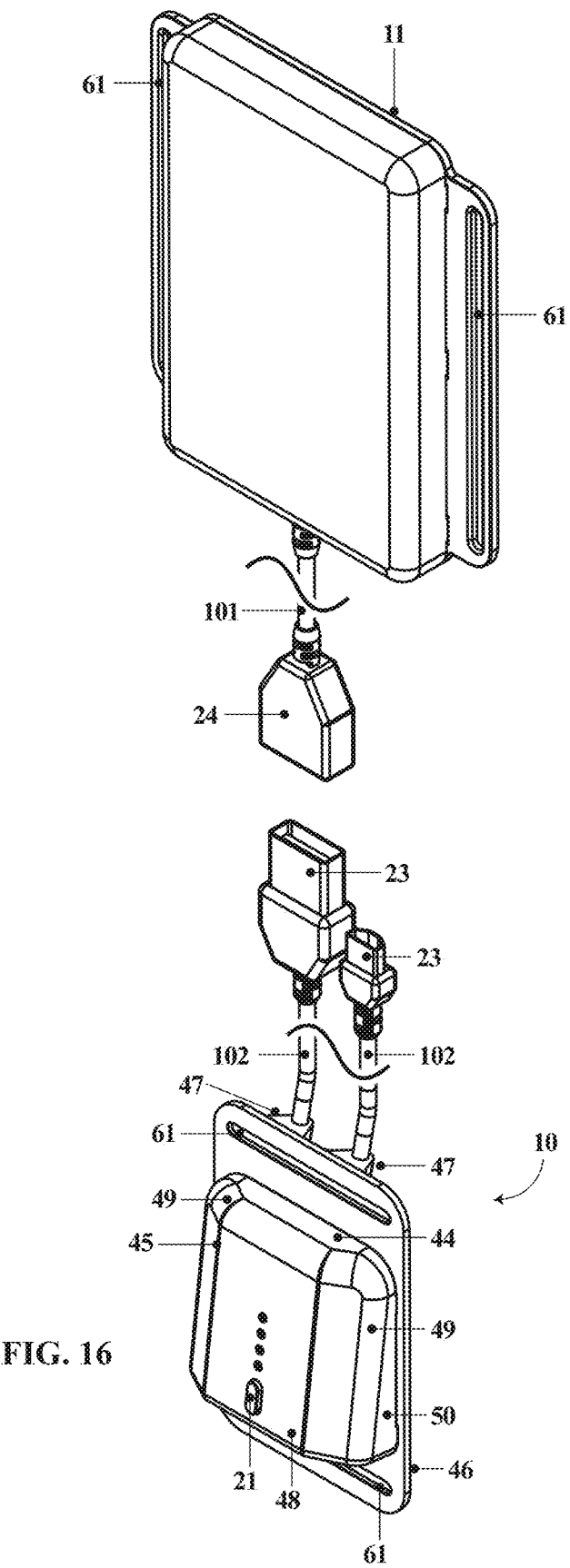

FIG. 16 is an exploded perspective view of a first upper battery power source outfitted with a first coupling or connector for mating with a second coupling or connector outfitted upon a lower power interface module according to the present invention.

Figures 17A, 17B, 17C:
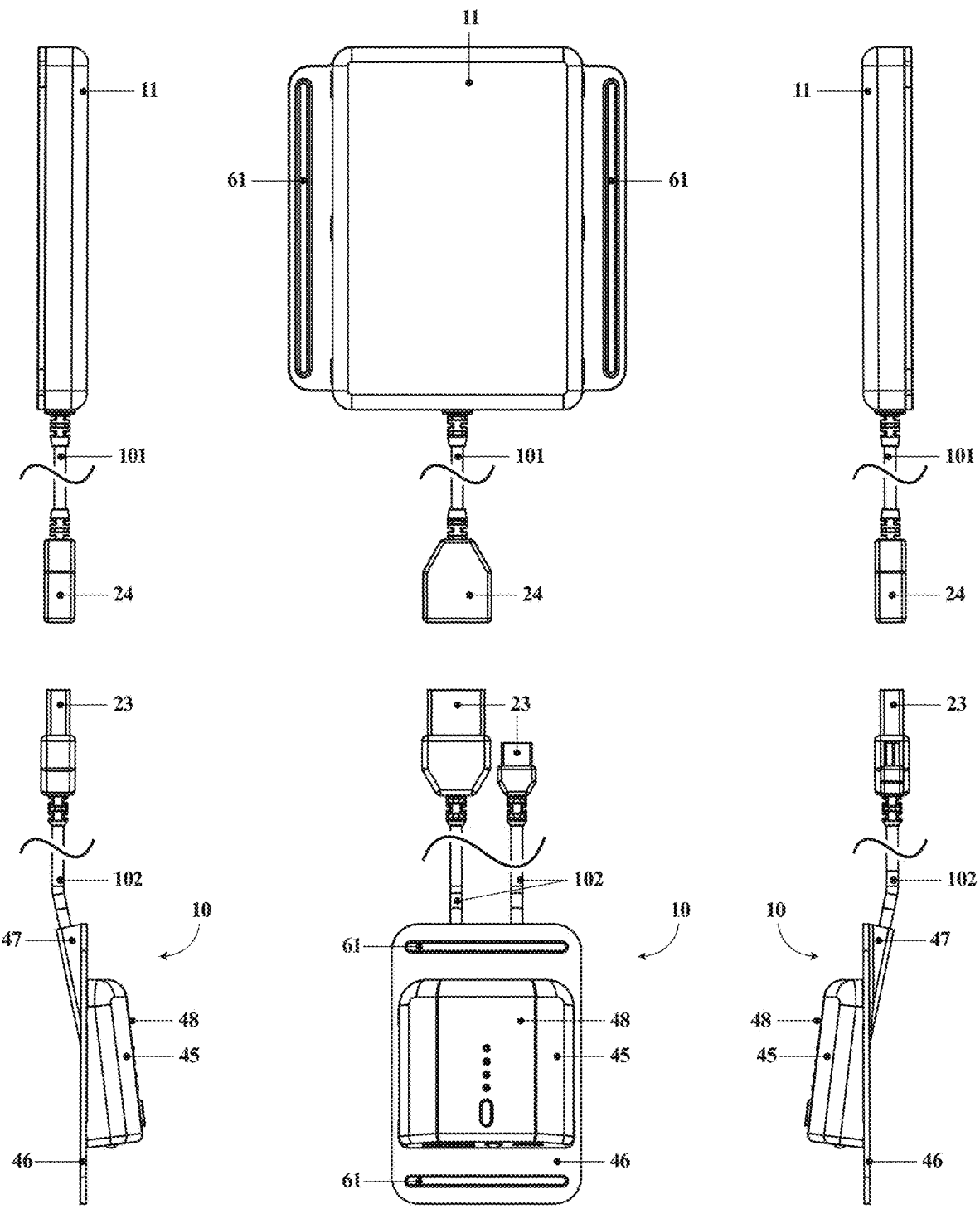

FIG. 17A is an exploded first lateral or side view of the first upper battery power source outfitted with a first coupling or connector for mating with a second coupling or connector outfitted upon a lower power interface module according to the present invention.

FIG. 17B is a first plan view of the structures otherwise depicted in FIG. 17A.

FIG. 17C is a second lateral or side view of the structures otherwise depicted in FIG. 17A.

Figure 18:
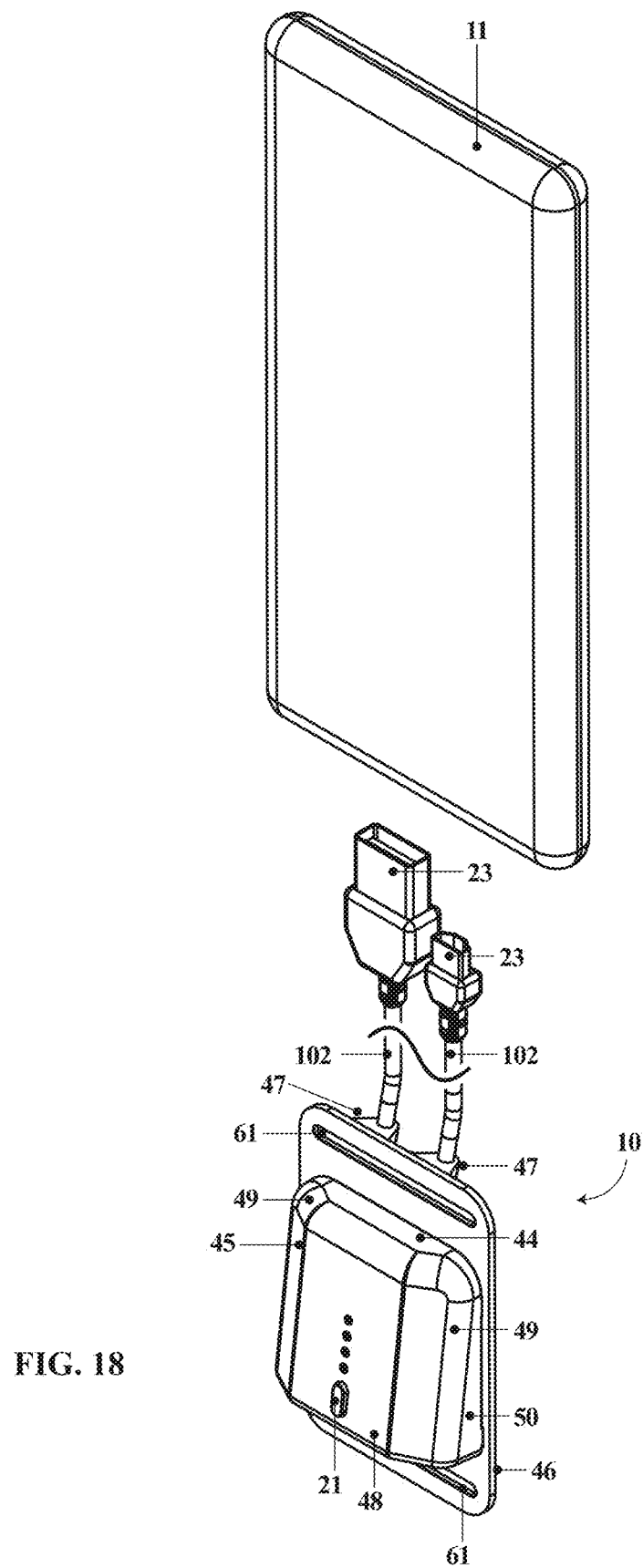

FIG. 18 is an exploded perspective view of a second upper battery power source outfitted with ports for mating with coupling(s) or connector(s) outfitted upon a lower power interface module according to the present invention.

FIG. 19A is an exploded first lateral or side view of the second upper battery power source with ports for mating with coupling(s) or connector(s) outfitted upon a lower power interface module according to the present invention.

FIG. 19B is a first plan view of the structures otherwise depicted in FIG. 19A.

FIG. 19C is a second lateral or side view of the structures otherwise depicted in FIG. 19A.

Figure 20:
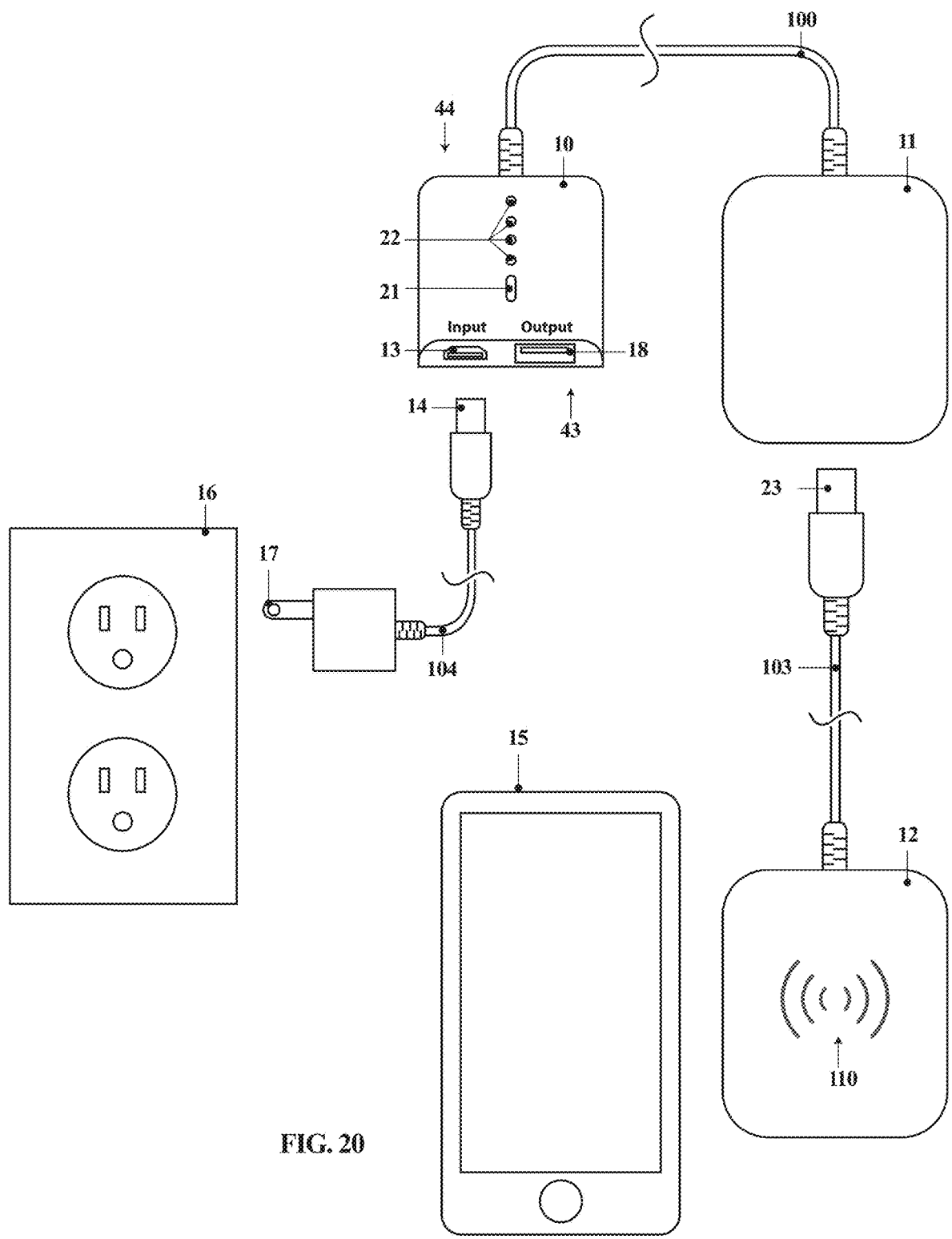

FIG. 20 is a diagram depicting a fourth set of exemplary electrical connections according to the present invention showing an electrical outlet, a power interface module, a battery power source, an induction charger device outfitted with a connector, and a user's electrical device with a removable connector between the electrical outlet and power interface module and a mating end of the induction charger device outfitted with a connector for mated engagement with the battery power source.

Figure 21:
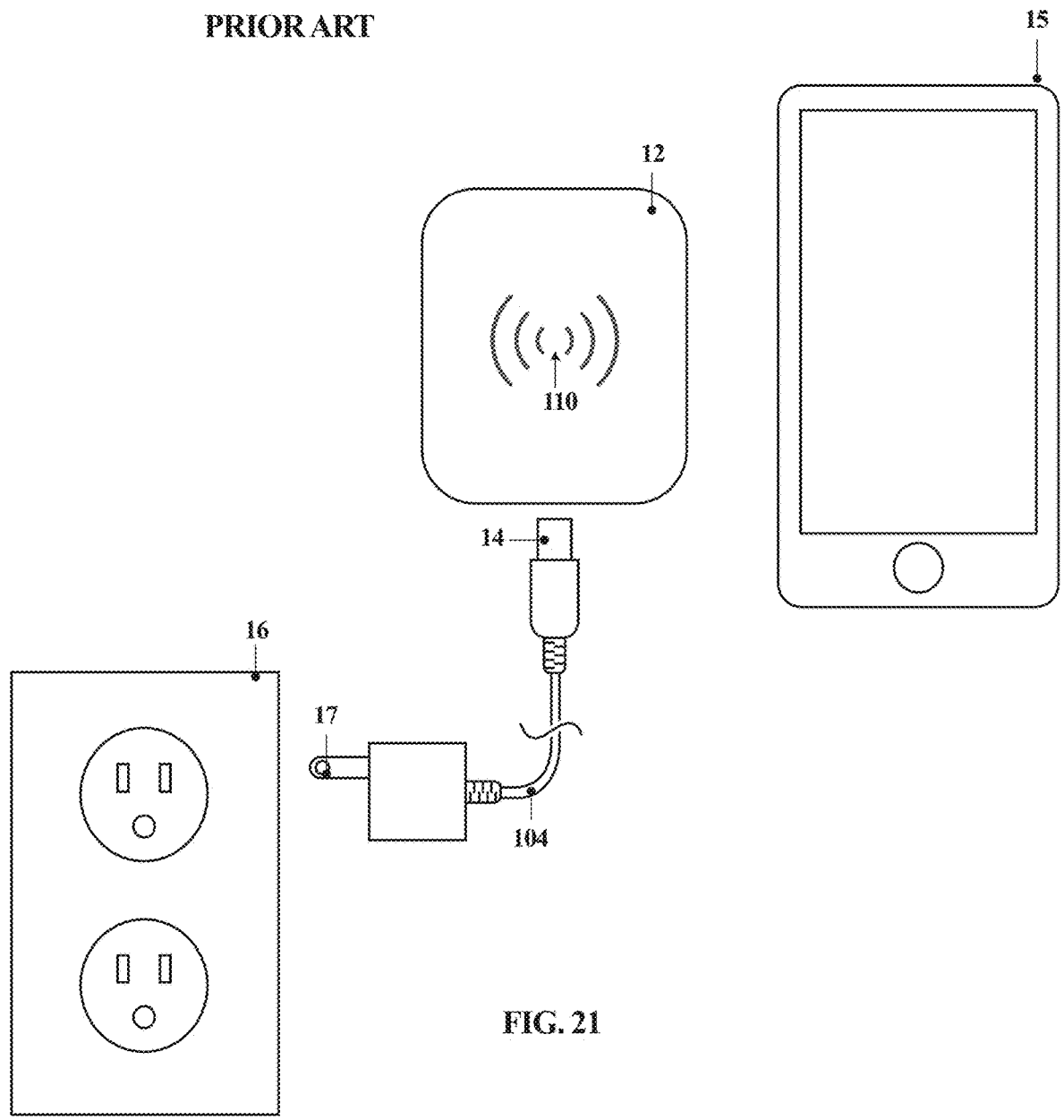

FIG. 21 is a fifth diagram depicting a fifth PRIOR ART set of exemplary electrical connections showing an electrical outlet, an induction charger device, and a user's electrical device with a removable connector between the electrical outlet and the induction charger device.

Figure 22:
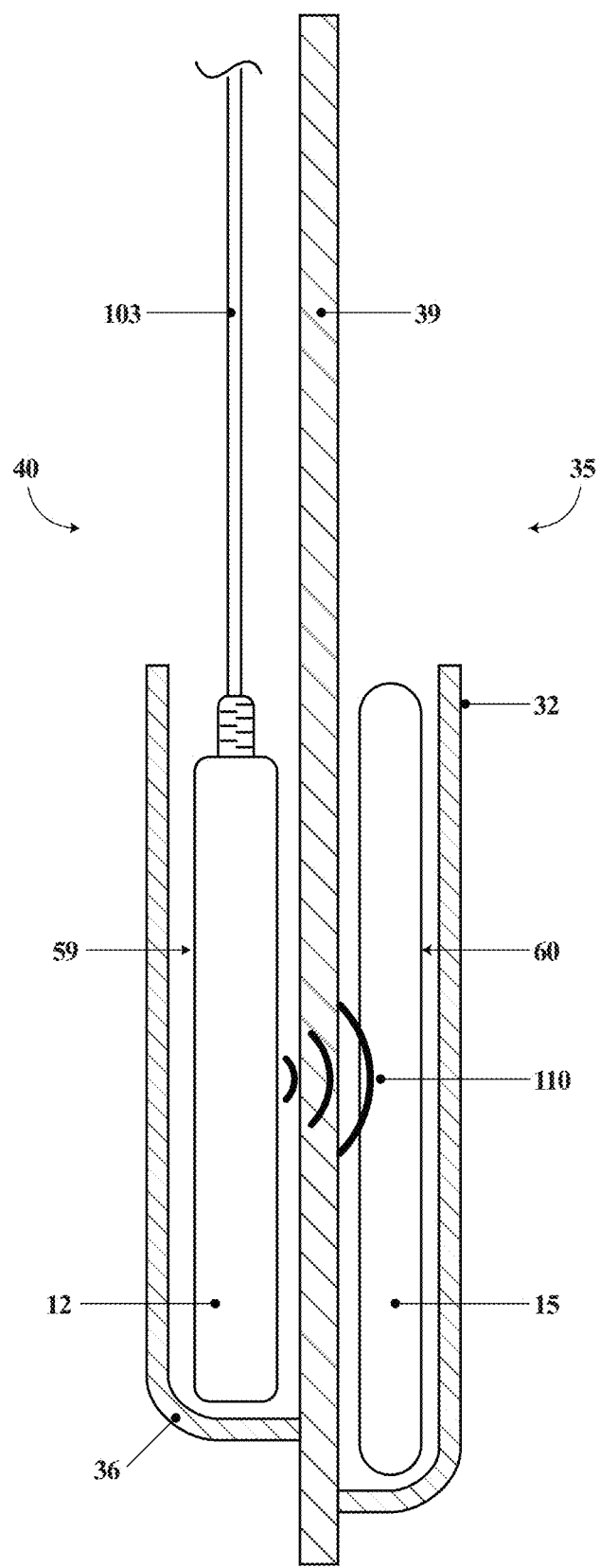

FIG. 22 is an enlarged diagrammatic cross-sectional depiction of an interface construction formed at an interface portion of the article-carrying tool depicting a wired induction charger device and a user's electronic device being positioned in alignment on opposite sides relative to a primary tool material section of the article-carrying tool.

Figure 23:
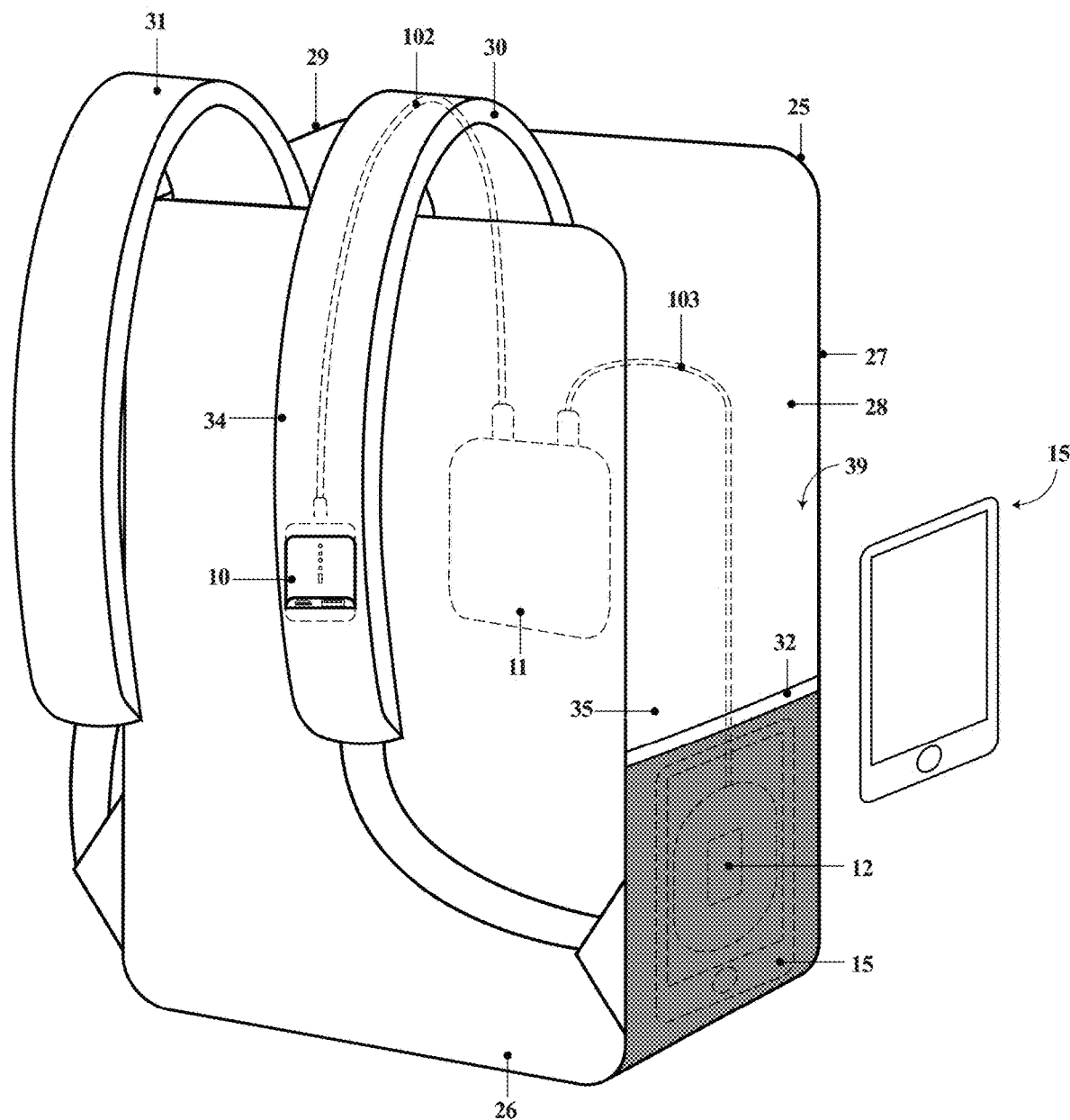

FIG. 23 is an anterior perspective depiction of a backpack version of a first alternative power interface ensemble according to the present invention showing an exposed portion of a power interface module, a hidden internal power source, a hidden induction charger device, and a user's electronic device exploded from the first alternative power interface ensemble.

Figure 24:
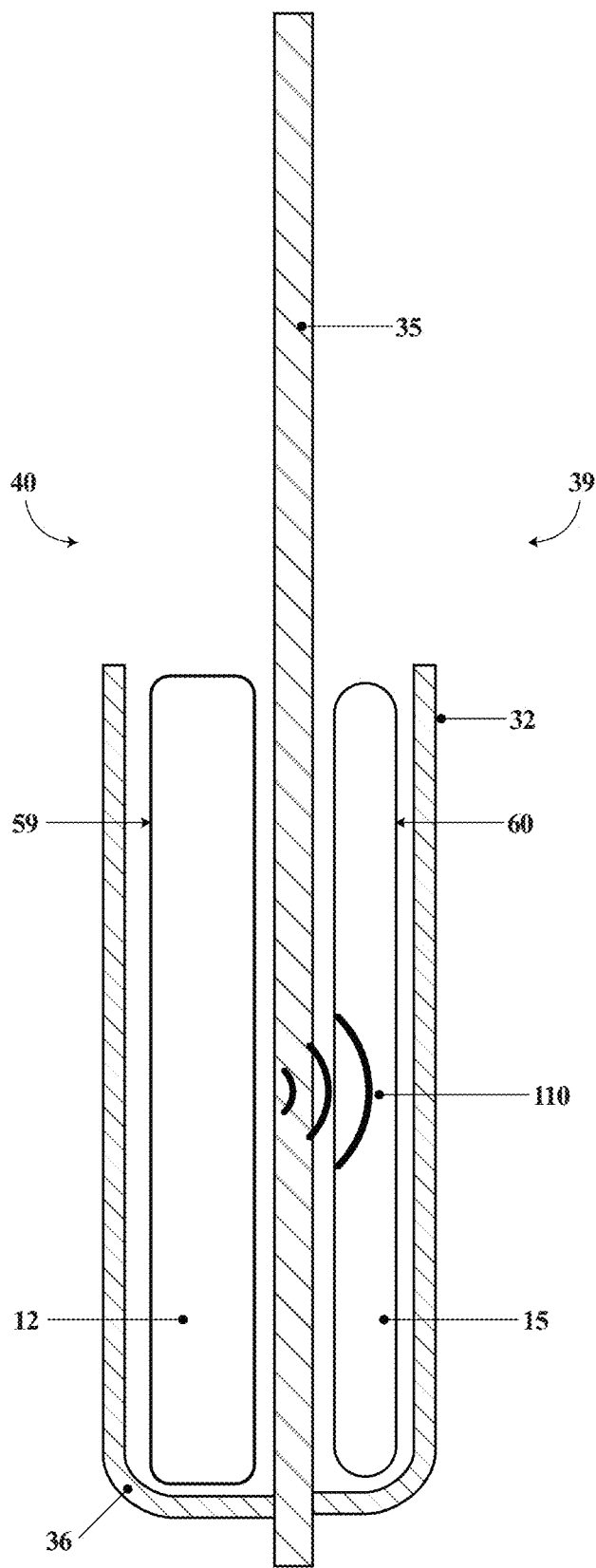

FIG. 24 is an enlarged diagrammatic cross-sectional depiction of an interface construction formed at an interface portion of the article-carrying tool depicting a wireless induction charger device and a user's electronic device being positioned in alignment on opposite sides relative to a primary tool material section of the article-carrying tool.

Figure 25:
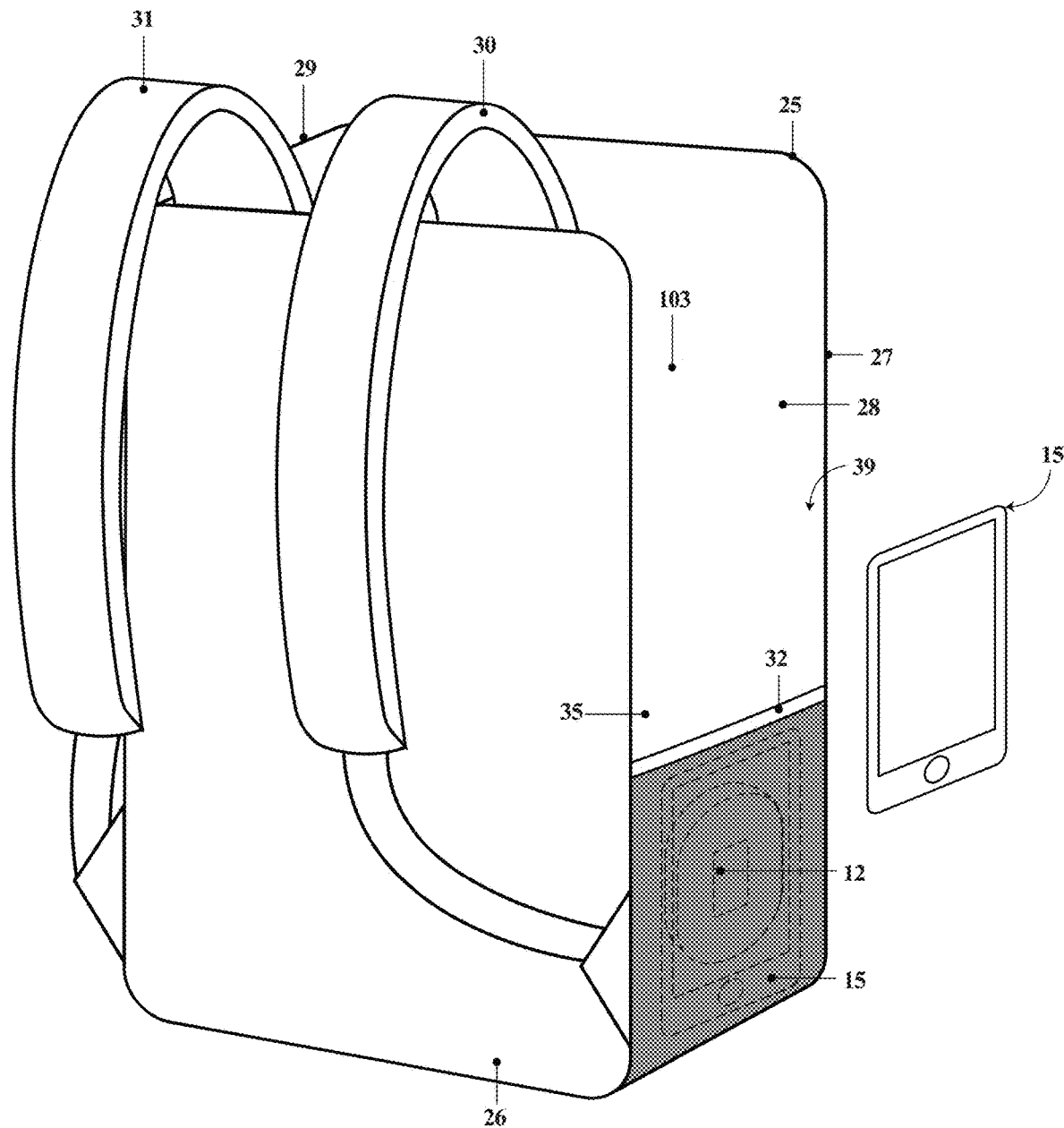

FIG. 25 is an anterior perspective depiction of a backpack version of a second alternative power interface ensemble according to the present invention showing a hidden induction charger device and a user's electronic device exploded from the second alternative power interface ensemble.

Figure 26:
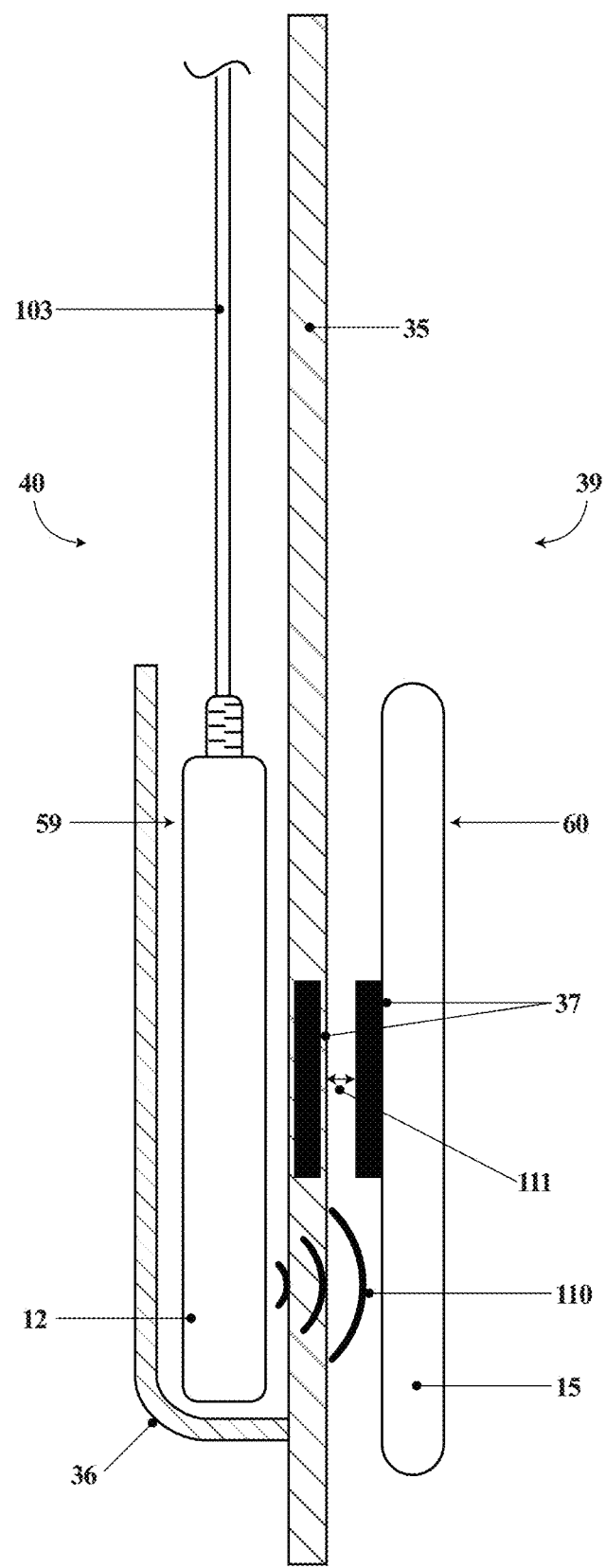

FIG. 26 is an enlarged diagrammatic cross-sectional depiction of a first alternative interface construction formed at an interface portion of the article-carrying tool depicting a wired induction charger device and a user's electronic device being magnetically positioned in alignment on opposite sides relative to a primary tool material section of the article-carrying tool.

Figure 27:
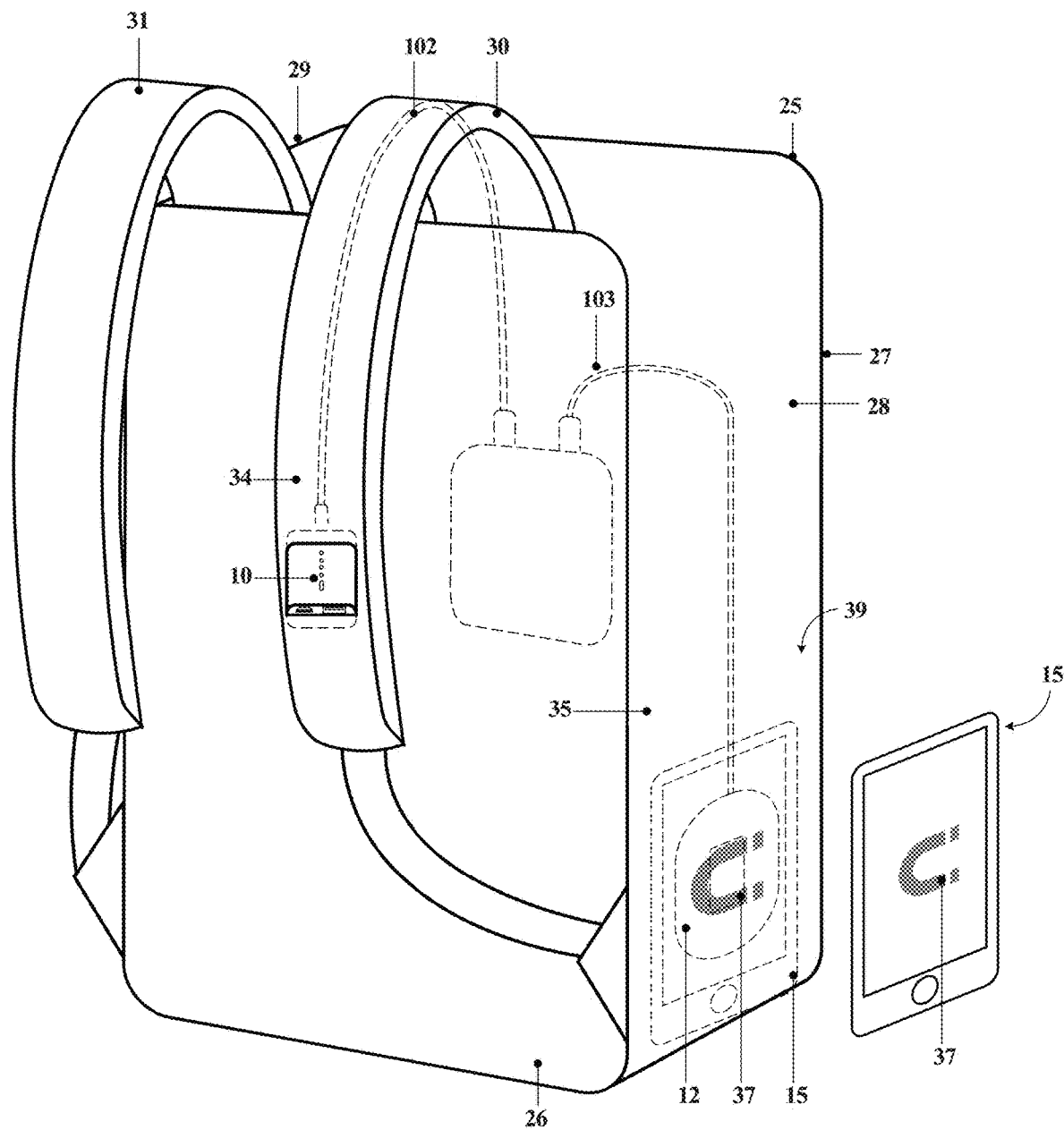

FIG. 27 is an anterior perspective depiction of a backpack version of a third alternative power interface ensemble according to the present invention showing an exposed portion of a power interface module, a hidden internal power source, a hidden induction charger device, and a user's electronic device exploded from the third alternative power interface ensemble.

Figure 28:
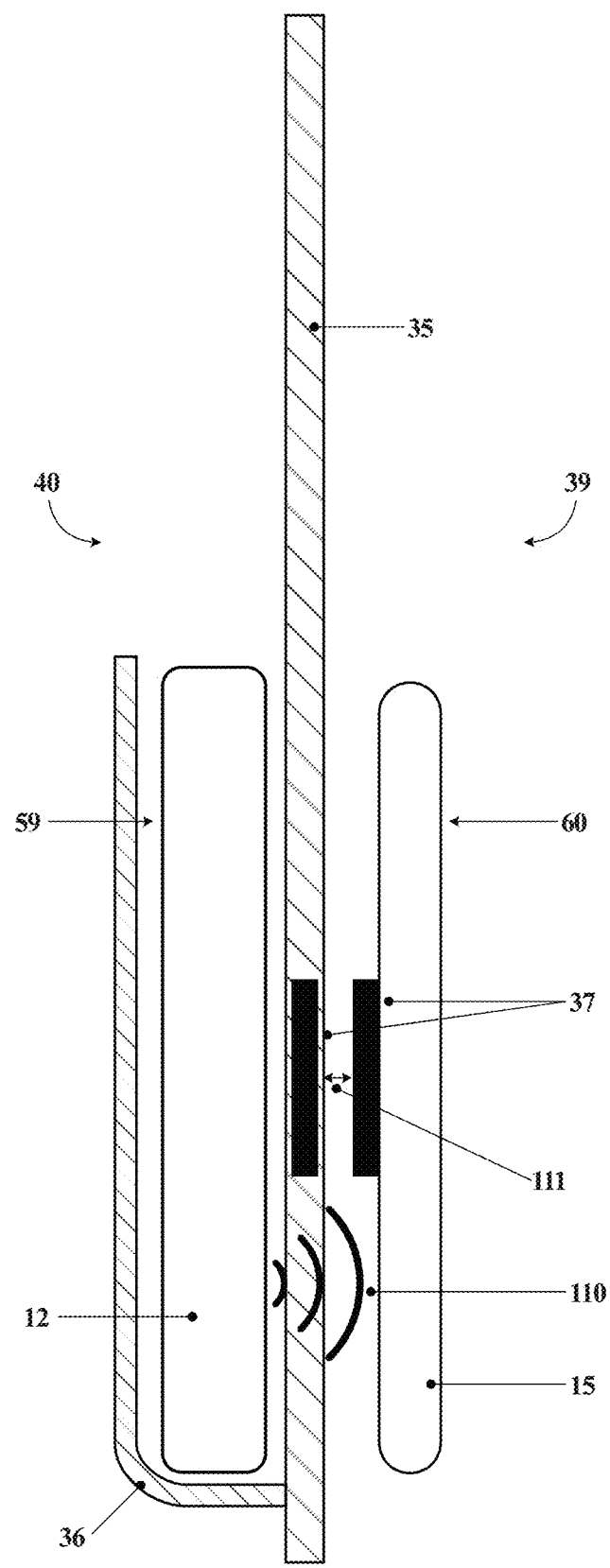

FIG. 28 is an enlarged diagrammatic cross-sectional depiction of a first alternative interface construction formed at an interface portion of the article-carrying tool depicting a wireless induction charger device and a user's electronic device being magnetically positioned in alignment on opposite sides relative to a primary tool material section of the article-carrying tool.

Figure 29:
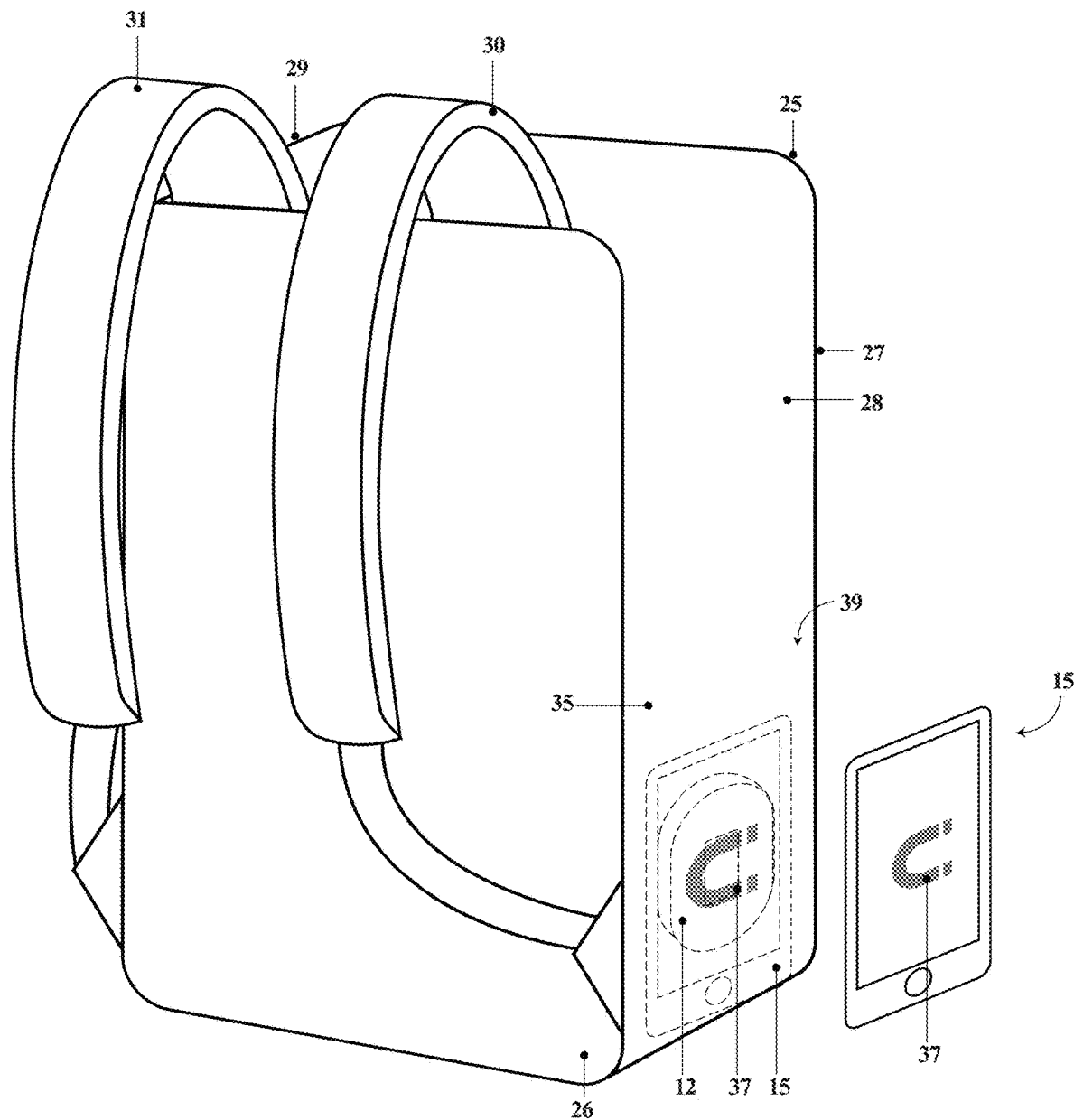

FIG. 29 is an anterior perspective depiction of a backpack version of a fourth alternative power interface ensemble according to the present invention showing a hidden induction charger device and a user's electronic device exploded from the fourth alternative power interface ensemble.

Figure 30:
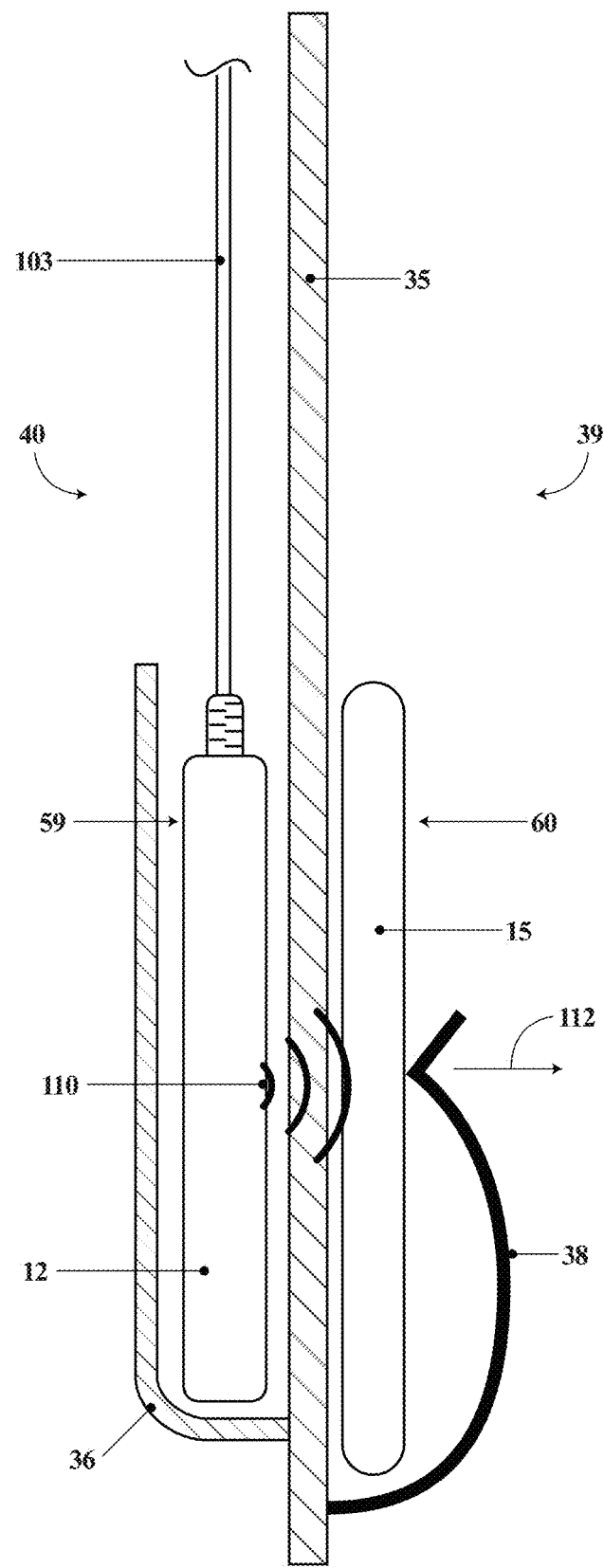

FIG. 30 is an enlarged diagrammatic cross-sectional depiction of a second alternative interface construction formed at an interface portion of the article-carrying tool depicting a wired induction charger device and a user's electronic device being clip-positioned in alignment on opposite sides relative to a primary tool material section of the article-carrying tool.

Figure 31:
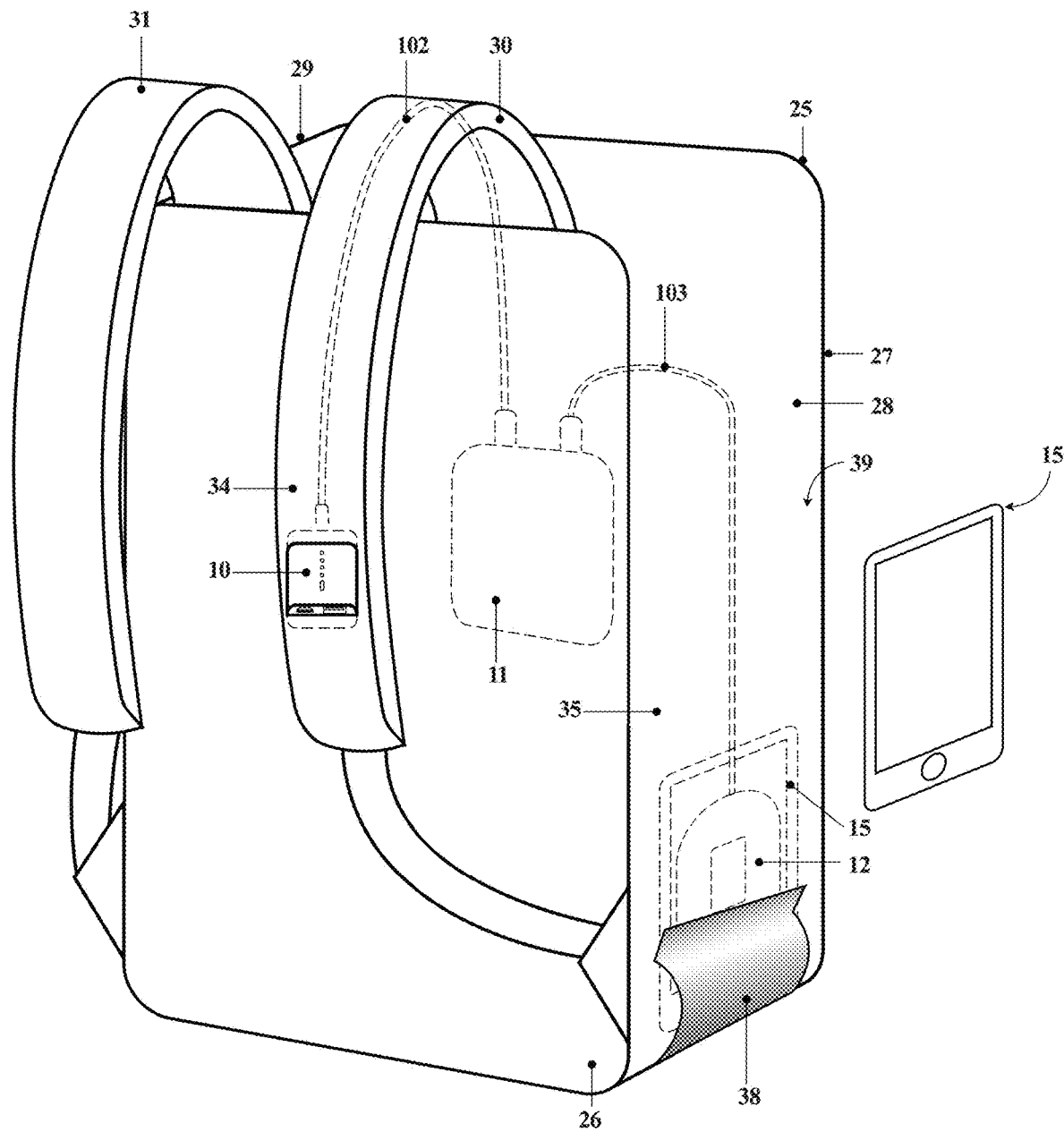

FIG. 31 is an anterior perspective depiction of a backpack version of a fifth alternative power interface ensemble according to the present invention showing an exposed portion of a power interface module, a hidden internal power source, a hidden induction charger device, and a user's electronic device exploded from the fifth alternative power interface ensemble.

Figure 32:
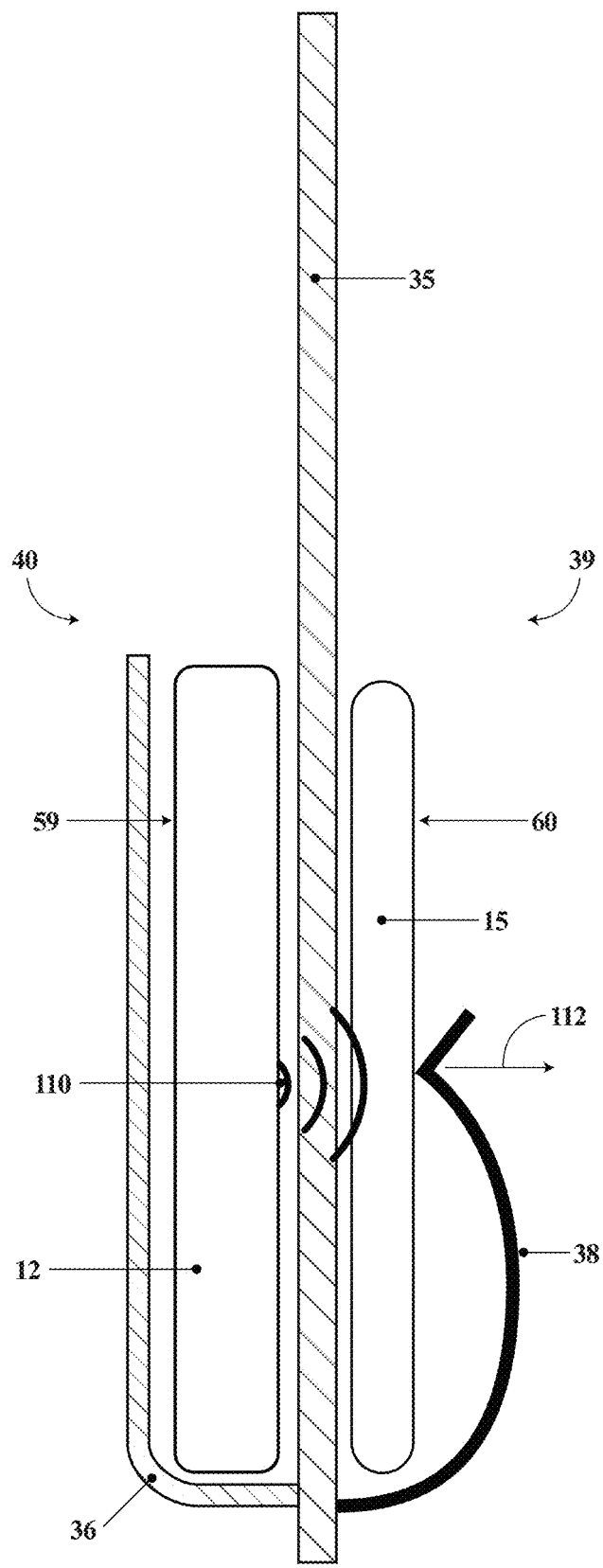

FIG. 32 is an enlarged diagrammatic cross-sectional depiction of a second alternative interface construction formed at an interface portion of the article-carrying tool depicting a wireless induction charger device and a user's electronic device being clip-positioned in alignment on opposite sides relative to a primary tool material section of the article-carrying tool.

Figure 33:
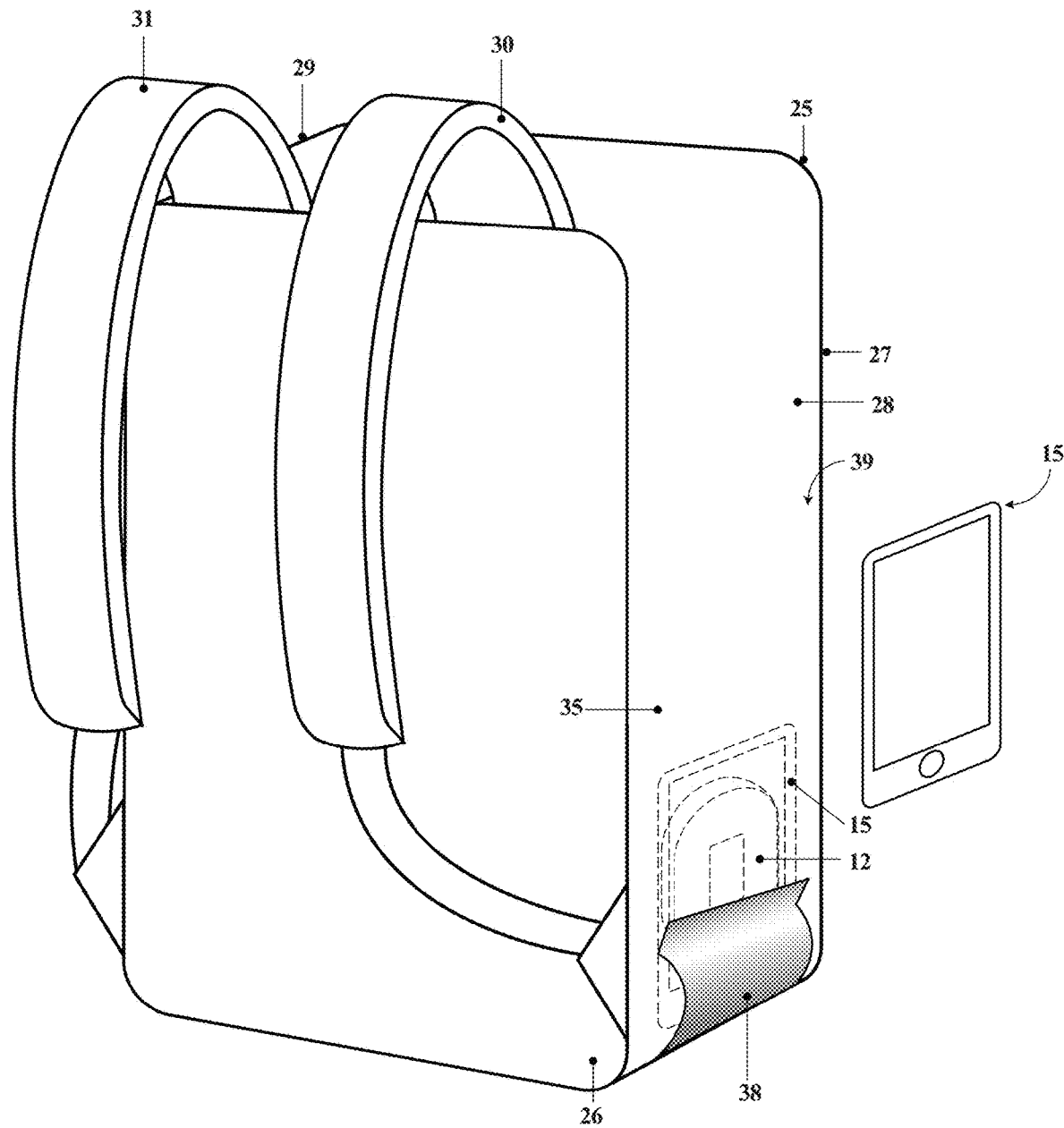

FIG. 33 is an anterior perspective depiction of a backpack version of a sixth alternative power interface ensemble according to the present invention showing a hidden induction charger device and a user's electronic device exploded from the sixth alternative power interface ensemble.

DETAILED DESCRIPTION OF THE PREFERRED EMBODIMENTS

Referring now to the drawings with more specificity, the present invention preferably provides a preferred power interface ensemble necessarily including a particularly constructed power interface module as generally depicted and referenced at 10 throughout the drawings submitted in support of these specifications. The preferred power interface ensemble, inclusive of the power interface module 10 according to the present invention may preferably include any number of electrical systems for inclusion therein as exemplified by the electrical systems of components generally depicted in FIGS. 1, 2, 3, and 20.

Figure 1:
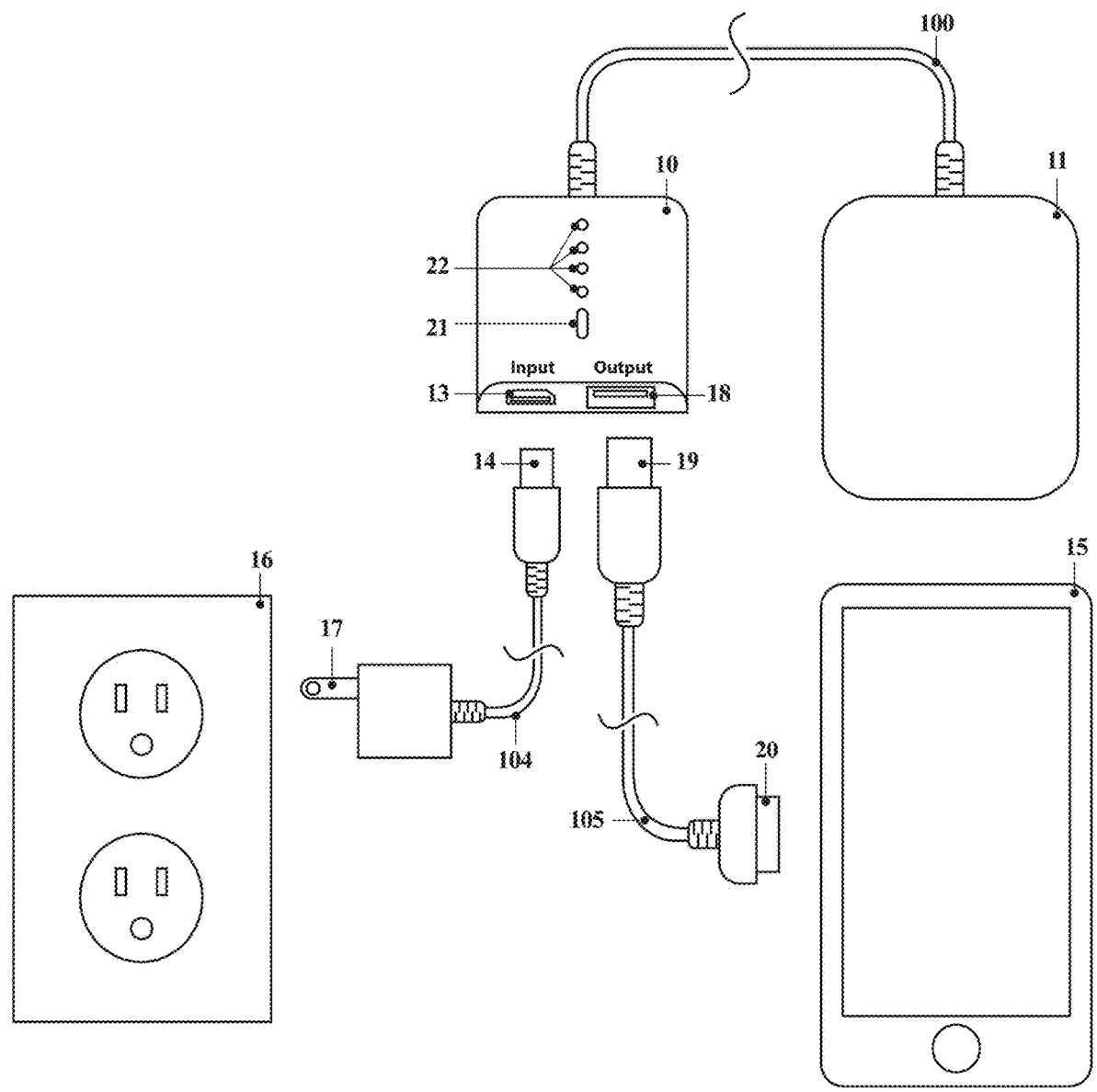
Figure 2:
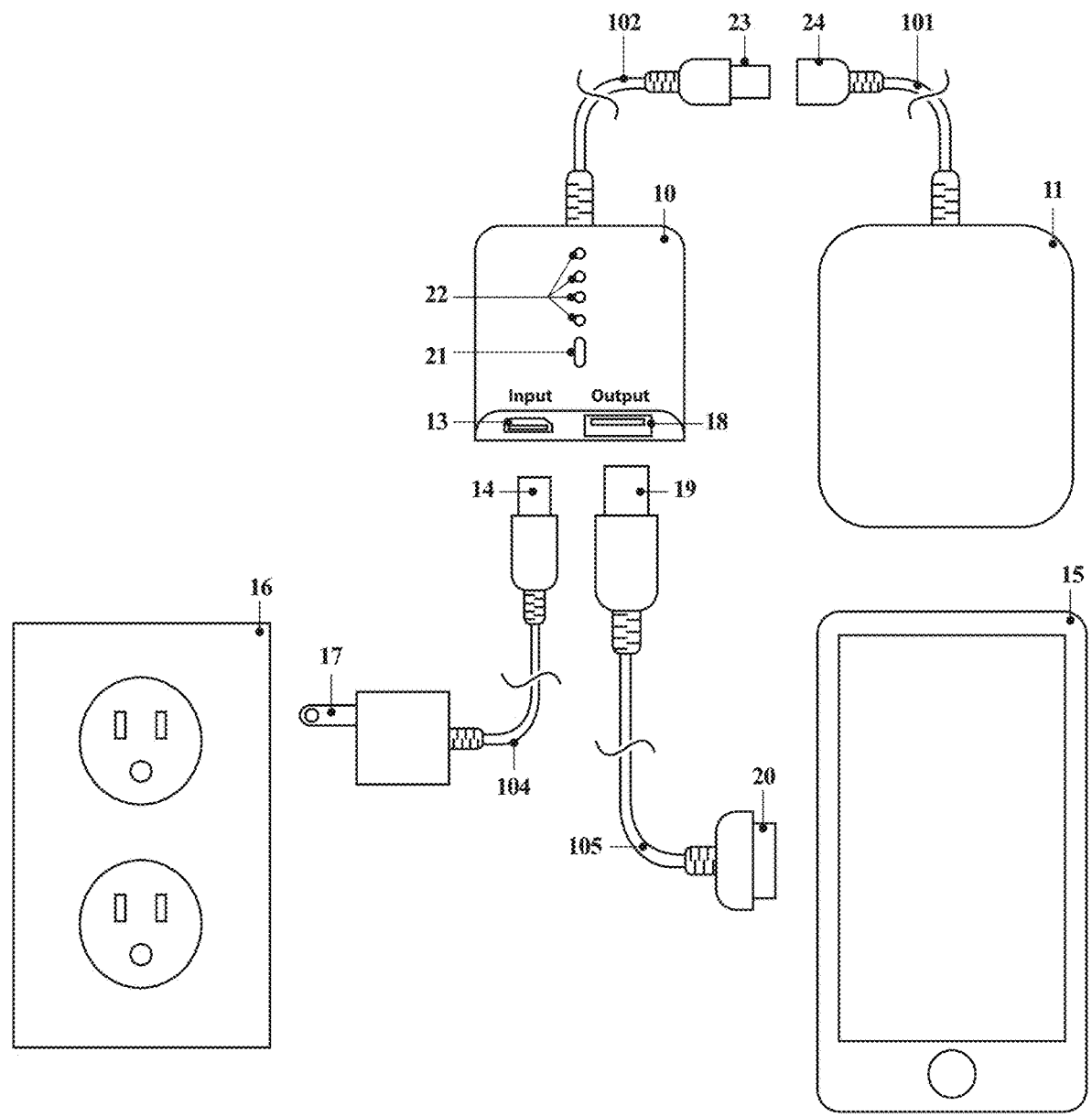

Referencing FIGS. 1, 2, 3, and 20, the reader will there consider that the present invention contemplates the preferred inclusion of at least a battery type power source as variously exemplified and the power interface module 10. FIG. 1 depicts a battery power source 11 permanently wired as at permanent conductor connector 100 to the power interface module 10. FIG. 2 depicts a battery type power source 11 having at least one first matable permanent conductor connector 101 outfitted therewith, which first matable permanent conductor connector 101 couples or mates with a second matable permanent conductor connector 102 outfitted upon or with the power interface module 10.

Figure 3:
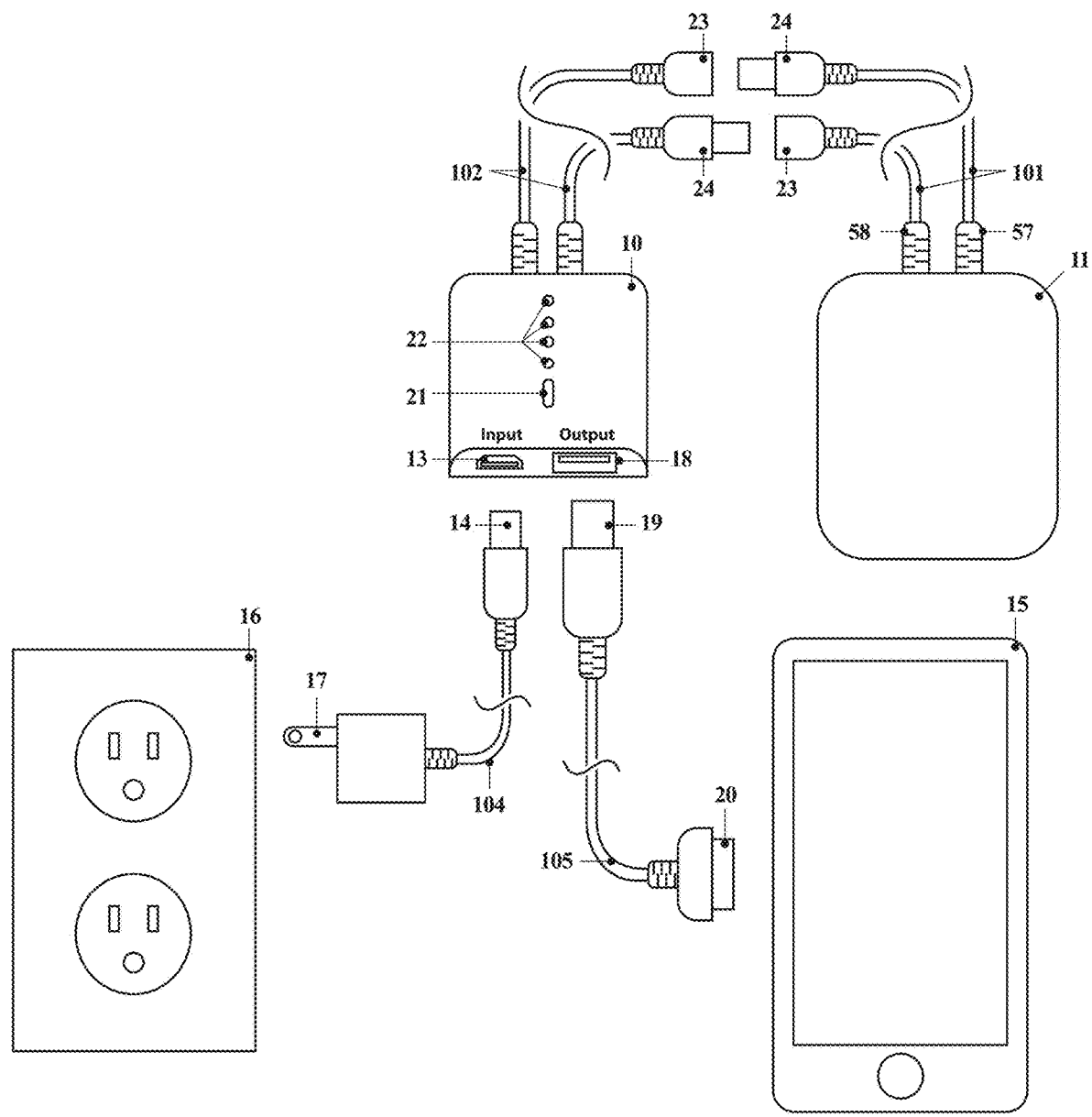

FIG. 3 depicts a battery type power source 11 having dual first matable permanent conductor connectors 101 and a power interface module 10 having dual second matable permanent conductor connectors 102. Connectors 101 and 102 may preferably be outfitted with either matable ends 23 and 24 for mating with one another. FIG. 20 depicts a battery type power source 11 permanently wired as at permanent conductor connector 100 to the power interface module 10. FIG. 20 generally depicts an electrical system that includes a wireless induction charger device 12 outfitted with a third matable permanent conductor connector 103 for enabling wireless charging of the user's electronic device (e.g. a mobile communications device such as a smart phone or tablet computer) generically depicted and referenced at 15 throughout the drawings submitted in support of these specifications.

It is contemplated that all battery type power sources 11 according to the present invention preferably be rechargeable so that the battery type power sources 11 may be periodically recharged for furnishing the power interface ensemble with a ready power source for recharging the user's electronic device 15. The power interface module 10 preferably further includes an interface input port 13 that receives or mates with a first end 14 of a removable cable 104 that may be connected to an external power source exemplified by an electrical outlet 16 at a second plug end 17 of the removable cable 104.

The removable cable 104 thus connects the battery type power source 11 to the external power source exemplified by an electrical outlet 16 via the power interface module 10 and connectors as variously exemplified. The interface input port 13 may be a port for connecting to, for example, an alternating current power supply, a Universal Serial Bus (USB) connector, IEEE 1394 interface (FireWire™), or another suitable connector known in the art. While the external power source is depicted or exemplified as an alternating current wall outlet 16, the external power source may be any suitable source of power, including, for example, an output from solar power cells.

The power interface module 10 may further preferably comprise an interface output port as at 18 that receives a first end 19 of a module-to-device cable 105 that is further matable with the user's electronic device 15 at a second end 20 of the module-to-device cable 105. By intercommunicating the user's electronic device 15 to the (rechargeable) battery type power source 11, the user's electronic device 15 may be selectively recharged by the battery type power source 11 via the power interface module 10. The interface output port 18 may be exemplified by a port for connecting to a Universal Serial Bus (USB) connector, IEEE 1394 interface (FireWire™), or another suitable connector known in the art.

A switch 21 is preferably provided on or otherwise outfitted with the power interface module 10. Switch 21 may be a power switch to thereby turn power delivery from the power source 12 on and off. A series of status indicator lights or lamps as at 22 may be further provided on the power interface module 10 for visually alerting the user whether the power source 11 is charging, the amount of charge remaining in the power source 120, and whether user's electronic device 15 is charging thereby discharging the power source 11.

For example, a fully charged power source 11 may be indicated when all of the indicator lights 22 are illuminated. In addition, the color of the status indicator lights 22 may change based on whether the power source 11 is being charged. When charging the auxiliary power source 11, the external power source 16 is connected to the interface input port 13 of the power interface module 10 via the cable 104. To charge the electronic device 15, the electronic device 15 is plugged into the interface output port 18 of the power interface module 10 via cable 105, and optionally, switch 21 may be activated to allow power delivery through the circuitry.

According to the electrical systems shown in FIGS. 2 and 3, these systems may preferably include the power interface module 10 that is removably connected to the power source 11. Accordingly, it will be understood the power source 11 may be removed from systems of this type and be replaced without requiring the replacement of other components, such as the power interface module 10. The configuration also permits a user to provide a suitable power source 11 of their own choosing, without being tied to any particular manufacturer.

Figure 4:
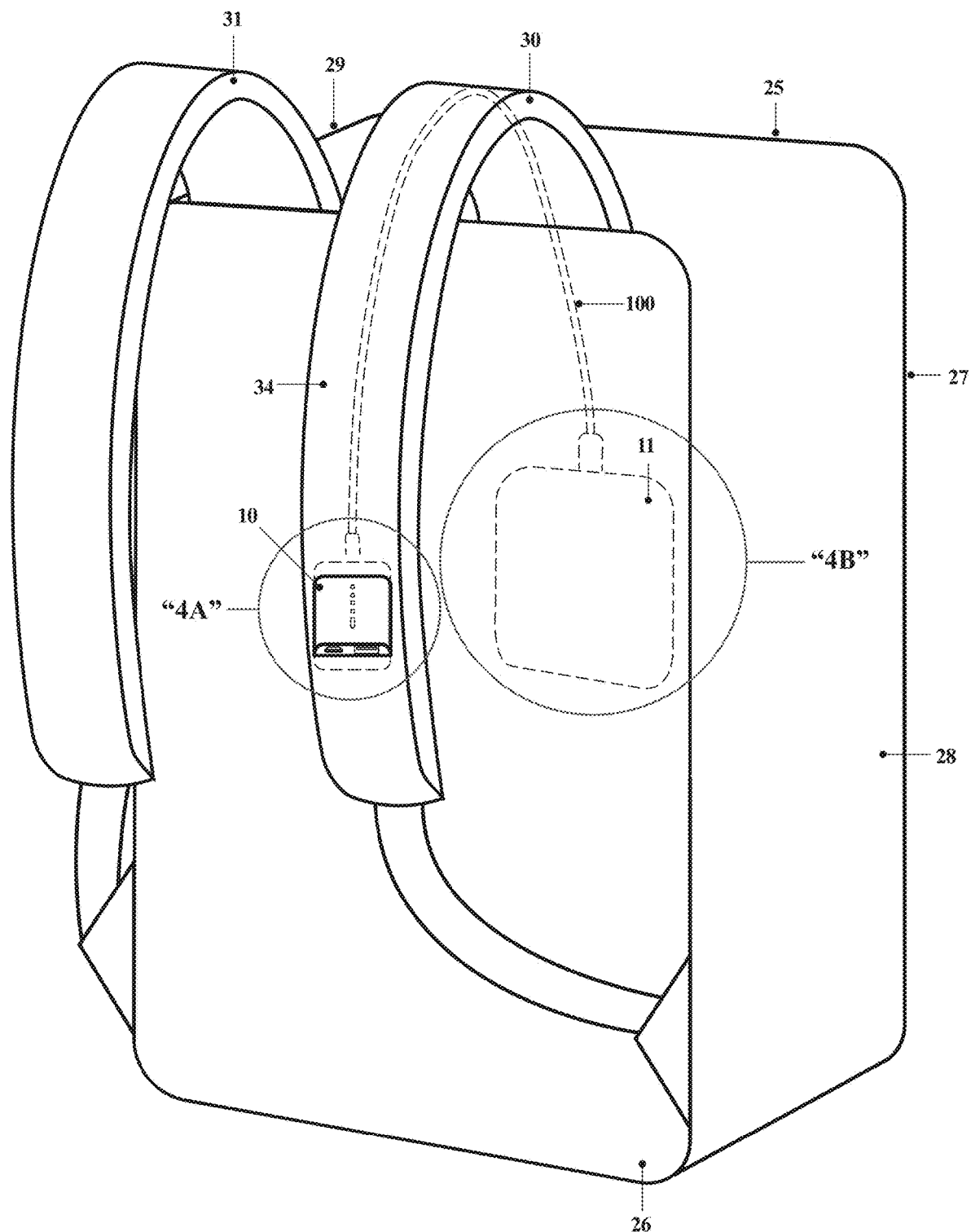
FIG. 4 is an anterior perspective depiction of a backpack version of the power interface ensemble according to the present invention showing an exposed portion of a power interface module and a hidden internal power source.
Figure 4A:
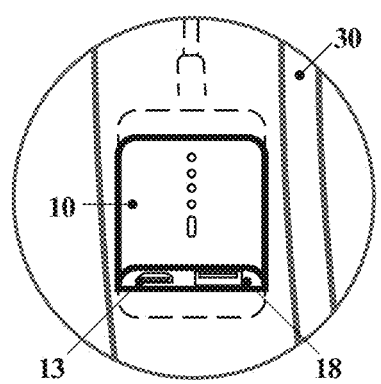
FIG. 4A is a fragmentary sectional view as sectioned from FIG. 4 showing the exposed portion of a power interface module.
Figure 4B:
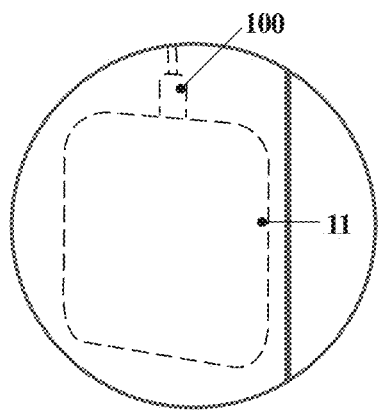
FIG. 4B is a fragmentary sectional view as sectioned from FIG. 4 showing the hidden internal power source.

Comparing FIGS. 1 and 4, it will be seen that the exemplified power interface ensemble shown in FIG. 4 is outfitted with the electrical system generally depicted in FIG. 1. It will be understood that the electrical systems shown in FIGS. 2 and 3 may also be outfitted in the power interface ensemble generally depicted in FIG. 4. Further, while the exemplified power interface ensemble in FIG. 4 has been depicted as comprising a backpack 25, the article-carrying tool exemplified by a backpack 25 should not be viewed as limiting. For example, it is contemplated the variously exemplified electrical systems may be outfitted in at least the following types of article-carrying tools: a messenger bag; a briefcase; a duffel bag; and a suitcase. While the figures depict an exemplary backpack type carrying tool, the present invention may be implemented in various types of bags or similar other carrying cases.

FIGS. 4, 23, 25, 27, 29, 31, and 33 all depict a backpack type or version of the generic article-carrying tool 25 contemplated by these specifications. The exterior shell or casing of the backpack type article-carrying tool 25 has an anterior side 26, a posterior side 27, a first lateral side 28, and a second lateral side 29. A first strap 30 and a second strap 31 are provided so that a user may carry the backpack type article-carrying tool 25 by looping one's arms through the loops formed by the first and second straps 30 and 31. The backpack type article-carrying tool 25 may also be outfitted with one or more pockets as at 32. When in use, the anterior side 26 is positioned closer to the user with the posterior side 27 being positioned away from the user.

Comparatively referencing FIGS. 4, 4A, 6A, 6B, 7, 8, 11, and 12, the reader will there consider the backpack type article-carrying tool 25 preferably provided with an interface opening 33 on the first strap 30. An exterior portion of the power interface module 10 is received and positioned in the interface opening 33 formed in the first strap 30 of the backpack type article-carrying tool 25 such that the interface input port 13 and the interface output port 18 are positioned adjacent the first strap 30 the backpack type article-carrying tool 25. It will be understood that the interface opening 33 is preferably formed in an in an exterior tool (material) plane or shell of the article-carrying tool as generally depicted and referenced at 34. The exterior tool plane or shell 34 is believed generic to all exemplary article-carrying tools of the type contemplated by these specifications.

Accordingly, the power interface module 10 is accessible from the outside of the backpack type article-carrying tool 25. The cable or connector 100 is preferably provided on the inside of the backpack type article-carrying tool 25 as depicted in FIG. 4 to connect the power interface module 10 to the internal power source 11, which internal power source 11 is preferably also positioned inside the backpack type article-carrying tool 25. Thus, a user may access the power interface module 10 to charge the internal power source 11 and/or charge an electronic device 15 without the need to open the backpack type article-carrying tool 25. Alternative electrical systems may also be used in the backpack type article-carrying tool 25 as further and comparatively depicted in FIGS. 23, 25, 27, 29, 31, and 33.

As prefaced above, and as further generally depicted in FIGS. 4, 4A, 6A, 6B, 7, 8, 11, 12, 23, 27, and 31, the backpack type article-carrying tool 25 is provided with an interface opening 33 on the first strap 30. The power interface module 10 is positioned at the interface opening 33 on the first strap 30 of the backpack type article-carrying tool 25 such that the interface input port 13 and the interface output port 18 are positioned on the exterior of the first strap 30 of the backpack type article-carrying tool 25. Accordingly, the power interface module 10 is accessible from the outside of the backpack type article-carrying tool 25.

Cables or connectors 100 or 102 are preferably provided on the inside of the backpack type article-carrying tool 25 to connect or communicate the power interface module 10 to the internal power source 11, which internal power source 11 is also provided inside the backpack type article-carrying tool 25. In this regard, the cables or connectors 100/102 may preferably extend along the interior of the first strap 30 from the power interface module 10 to the internal power source 11 provided within the shell or exterior tool material plane of backpack type article-carrying tool 25. Thus, a user may access the interface module 10 to charge the internal power source 11 and/or charge an electronic device 15 without the need to open the backpack type article-carrying tool 25.

Comparatively referencing FIGS. 20-33, the reader will there consider a number of exemplary embodiments comprising capabilities for inductive or wirelessly charging a user's electronic device 15 and/or the internal power source 11 included within the article-carrying tool 25 exemplified by a backpack. For example, inductive charging (also known as "wireless charging") uses an electromagnetic field to transfer energy between two objects. This may be done with a charging station. For example, energy may be sent through an inductive coupling to an electrical device, which can then use that energy to charge batteries of the device or otherwise run the device.

Induction charger devices as at 12 typically provide an induction coil (not shown) to create an alternating electromagnetic field from within a charging base station, and a second induction coil (not shown) in the portable electronic device as at 15 takes power from the electromagnetic field and converts it back into electrical current to charge the power source of the electronic device. The two induction coils in proximity combine to form an electrical transformer.

According to the embodiments shown in FIGS. 23, 25, 27 29 31, and 33, it is contemplated the inductive charging capability according to the present invention may be more convenient and less obtrusive for the user than embodiments that provide wired connections. As depicted in FIG. 23, the backpack type article-carrying tool 25 there illustrated as outfitted with the electrical circuitry is capable of wirelessly charging an electronic device 15. The backpack type article-carrying tool 25 is also outfitted with a power interface module 10 having an interface input port 13 and an interface output port 18, as previously described.

Referencing FIG. 23, the reader will there consider that power interface module 10 is connected to the internal power source 11 by cable or connector 102. An inductive charger device 12 is electrically connected to the internal power source 11 by a cable or connector 103. The inductive charger device 12 is outfitted with wireless charging technology such that the inductive charger device 12 generates an electromagnetic field as at arcuate lines 110 to wirelessly charge the electronic device 15.

The inductive charger device 12 is preferably positioned in a convenient location on the article-carrying tool so that the user could easily charge an electronic device 15 such as a mobile phone or tablet computer. In this regard, it is contemplated that the article-carrying tool according to the present invention may preferably comprise a particular interface construction 40 for enabling the inductive or wireless charging capability. Referencing FIGS. 22-33, the interface construction 40 is preferably formed at a convenient interface portion 39 of the article-carrying tool and comprises a primary tool material plane as at 35, an internal tool compartment as at 36, and an external tool device-positioning mechanism as variously exemplified.

The internal tool compartment 36 is believed preferably exemplified by a pocket construction. Similarly, the external-tool device-positioning mechanism may be exemplified by an external pocket as at 32. The user may thus place the electronic device 15 in an externally accessible pocket 32, or alternatively clip or magnetically attach the electronic device 15 to the article-carrying tool in convenient interface portion 39 in alignment with the inductive charger device 12 as received and positioned within the internal tool compartment 36.

The external-tool device-positioning mechanism may be further exemplified by either magnetic elements 37 or a clip feature 38 for positioning the electronic device in alignment with the internal tool compartment 36. In the case of magnetic elements 37, a first magnetic element 37 is cooperatively associated with the primary tool material plane 35 and a second magnetic element 37 is cooperatively associated with the electronic device 15 as generally depicted in FIGS. 26-29 for magnetically retaining as at arrows 111 the electronic device in alignment with the internal tool compartment 36. In the case of the clip feature 38, the clip feature 38 directs force 112 into the electronic device to retain the electronic device 15 in alignment with the internal tool compartment 36. Other attachment mechanisms may include snap or hook and loop fastener type mechanical attachments.

Being in alignment with the internal tool compartment 36 and the inductive charger device 12 received and positioned thereby, the electronic device 15 is automatically charged using the power stored in the internal power source 11 inside the article-carrying tool exemplified by a backpack 25. In this way, the user's experience would be simple and intuitive. Whenever the electronic device 15 is stowed at the convenient interface portion 39 (e.g. internal tool compartment 36 and external device-receiving pocket 32), the electronic device 15 is automatically charged without requiring any additional steps from the user and without the encumbrance of any wires or connectors. As depicted in FIGS. 23, 25, 27, 29, and 31, the convenient interface portion 39 may be provided at the first lateral side 28 or any other suitable location on the backpack type article-carrying tool 25 or similar other carrying case.

The variously exemplified power interface ensembles according to the present invention all enable a user to selectively charge an electronic device 15. In certain preferred embodiments, the power interface ensemble according to the present invention is believed to essentially comprise the power interface module 10 as a central feature. The power interface module 10 according to the present invention is used in combination with an article-carrying tool exemplified by a backpack type article-carrying tool 25 and an (internal) power source 11 carried by the article-carrying tool.

The article-carrying tool is believed to essentially and preferably comprise an interface opening as at 33, which opening 33 is preferably formed in an exterior tool plane 34 of the article-carrying tool. The (internal) power source as at 11 is preferably disposed within the article-carrying tool. The power interface module 10 is adapted to be electrically coupled to the power source 11 via cables or connectors as variously described and/or exemplified.

The power interface module 10 according to the present invention further preferably and essentially comprises a tool-exterior module portion as at 41 and a tool-interior module portion as at 42. The exterior tool module portion 41 may be preferably attached to the interior-tool module portion via a series of snap type fasteners as at 64 outfitted upon either the portion 41 or 42 and mated with fastener-receiving apertures 65 outfitted upon either the portion 42 or 41 as the case may be.

The tool-exterior module portion 41 preferably comprises a first exterior end as at 43, a second exterior end 44 opposite the first exterior end 43, and a port shroud 45 extending intermediate or from the first exterior end 43 to the second exterior end 44. The tool-interior module portion 42 preferably comprises a planar tool-interface portion as at 46, and at least one coupling shroud feature as at 47. Referencing FIG. 13, the reader will there consider dual coupling shroud features 47.

The tool-exterior module portion 41 is sized and shaped or dimensioned for receipt in the interface opening 33 and attachable to the planar tool-interface portion 46 of the tool-interior module portion 42 such that the planar tool-interface portion 46 and the exterior tool plane 34 extend in parallel planes 113 and 114 in juxtaposition relative to one another as generally and comparatively depicted in FIGS. 5A, 12, 12A, and 12B. The port shroud 45 extends outwardly as at arrow 115 relative to the exterior tool plane 34 and the article-carrying tool. The at least one coupling shroud 47 extends inwardly as at arrow 116 relative to the planar tool-interface portion 46 and the article-carrying tool.

The first exterior end 43 may preferably and essentially comprise an interface output port as at 18 for enabling connectivity to the electronic device 15. The interface output port 18 is in electrical communication with the at least one coupling shroud 47 via internal circuitry (not specifically illustrated). The at least one coupling shroud 47 may be placed into electrical communication with the (internal) power source 11 for communicating power from the (internal) power source 11 to the interface output port 18 for enabling the user to selectively charge the electronic device 15 via the interface output port 18.

The port shroud 45 of the exterior-tool module portion 41 preferably further comprises certain uniquely contoured outer port shroud surfacing. A planar outermost portion 48 of the outer port shroud surfacing extends in an outer shroud plane as at 117. The outer port shroud plane 117 preferably extends obliquely relative to the exterior tool plane 34 from the second exterior end 44 to the first exterior end 43. The second exterior end 44 and the outer port shroud plane 117 of the planar outermost portion 48 meet or junction at a radiused formation 49.

The radiused formation 49 preferably comprises radiused transverse cross-section and preferably further extends toward the first exterior end 43 outwardly adjacent lateral side portions 50 of the exterior tool module portion 41. The port shroud 45 further preferably comprises laterally opposed planar oblique sections 51. The laterally opposed planar oblique sections 51 extend in laterally opposed oblique planes 118, which planes 118 extend obliquely relative to plane 117 as generally depicted in FIG. 14. The reader will note that narrow radiused formations 52 preferably separate laterally opposed planar oblique sections 51 from the outermost planar portion 48. The reader will thus consider that all planar portions of the port shroud 45 are preferably separated by radiused formations.

The first exterior end 43 preferably extends in a first port plane as at 119. The first port plane 119 preferably extends obliquely relative to the exterior tool plane 34. The second exterior end 44 preferably extends in a second port plane 120, which second port plane 120 is preferably orthogonal to the exterior tool plane 34. Each coupling shroud 47 preferably comprises inwardly extending coupling shroud surfacing, the innermost extent of which coupling shroud surfacing preferably comprises or defines an inner coupling shroud plane as at 121. The inner coupling shroud plane 121 preferably extends obliquely relative to the tool-interface portion 46.

The reader will be careful to consider that the inner coupling shroud plane 121 and the outer port shroud plane 117 are preferably non-parallel or convergent. The outer port shroud plane 117 primary functions to direct matter away from the first exterior end 43 in a manner much akin to awning functionality. The inner coupling shroud plane 121 primarily enhances directed electrical communication between the interface output port 18 and the power source 11 at the coupling shroud(s) 47. In this regard, it will be seen that the cable or connector 102 is preferably angled relative to the exterior tool plane 34 at the shroud exit point(s) 56.

The inner coupling shroud plane 121 and the interface output port 18 are configured for enabling planar or linear electrical communication between the interface output port 18 and the coupling shroud(s) 47. In this regard, the reader will reference plane 122 in comparison to plane 121 noting the space therebetween. The space between planes 121 and 122 at the first exterior end 43 locates the interface output port 18 in that the interface output port 18 is preferably located intermediate the planes 121 and 122. The first exterior end 43 may further preferably comprise an interface input port as at 13 for connecting to an external power source as at 16, which interface input port 13 is preferably located as is the interface output port 18; that is, between planes 121 and 122.

As earlier described, the power interface module 10 is preferably and electrically coupled to the (internal) power source 11 by an internal cable or connector as variously exemplified. The internal cable or connector is preferably fixed to the power interface module 10 via the coupling shroud(s) 47 and the (internal) power source 11. The (internal) power source 11 may further preferably include a power source input portion as at 57 and a power source output portion as at 58. The internal cable or connector may preferably be adapted to connect the power interface module 10 to the (internal) power source 11 via the power source input portion 57 and the power source output portion 58.

An alternative power interface ensemble according to the present invention further enables a user to selectively charge a user's electronic device 15, but with wireless charging functionality, usable either in combination with the foregoing structural features or standing apart therefrom. An alternative power interface ensemble according to the present invention is thus believed to preferably and essentially comprise an article-carrying tool as various exemplified, an induction charger device as at 12, and an external-tool device-positioning mechanism.

The article-carrying tool preferably and essentially comprises an interface construction as at 40, which interface construction 40 is preferably formed or constructed at a (convenient) interface portion 39 of the article-carrying tool. The interface construction 40 preferably comprises a primary tool plane as at 35, an internal tool compartment as at 36, and an external tool device-positioning mechanism as variously exemplified. The internal tool compartment and the external-tool device-positioning mechanism are preferably aligned on opposite sides of the primary tool plane 35 as at 59 and 60.

The induction charger device 12 is received in the internal tool compartment 36 and is placed in communication with a power source 11 as variously exemplified. The internal tool compartment 36 is preferably dimensioned for fixedly positioning the induction charger device 12 adjacent the primary tool plane 35 at a first charging position 59 as generally depicted in FIGS. 22, 24, 26, 28, 30, and 32.

The external-tool device-positioning mechanism basically functions to position the electrical device 15 at a second charging position 60 opposite the first charging position 59 in alignment therewith. The induction charger device 12 and power source 11 thus enable the user to selectively charge the electrical device 15 via the primary tool plane 35. The external-tool device-positioning mechanism may be preferably exemplified by an external tool compartment such as a device-receiving pocket 32. The external tool compartment may thus receive and position the electrical device at the second charging position 60 linearly opposite the first charging position 59.

It will be seen that the both the planar tool-interface portion 46 and certain power sources 11 are outfitted with flange depressions as at 61. Flange depressions 61 may be utilized to stitch attach the corresponding structures to the material planes (e.g. exterior tool plane 34) against which they are juxtaposed. The preferred manner for attaching the power interface module 10 to the exterior tool plane 34 involves the step of compartmentalizing the module 10 between opposed layers of material 62, which opposed layers of material 62 may be further outfitted with a zipper as at 63 for selectively opening a compartment 64 comprising the opposed layers of material 62.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A power interface ensemble for enabling a user to selectively charge an electronic device, the power interface ensemble comprising:
    an article-carrying tool, the article carrying tool comprising an interface opening formed in an exterior tool plane of the article-carrying tool;
    an internal power source, the internal power source being disposed within the article-carrying tool; and
    a power interface module adapted to be electrically coupled to the power source, the power interface module comprising a tool-exterior module portion and a tool-interior module portion, the tool-exterior module portion comprising a first exterior end, a second exterior end opposite the first exterior end, and a port shroud extending intermediate the first exterior end and the second exterior end, the tool-interior module portion comprising a planar tool-interface portion and at least one coupling shroud;
    the tool-exterior portion being dimensioned for receipt in the interface opening and attachable to the planar tool-interface portion such that the planar tool-interface portion and the exterior tool plane extend in parallel planes in juxtaposition relative to one another, the port shroud extending outwardly relative to the exterior tool plane, the at least one coupling shroud extending inwardly relative to the planar tool-interface portion;
    the first exterior end comprising an interface output port for connecting to the electronic device, the interface output port being in electrical communication with the coupling shroud, the coupling shroud being in electrical communication with the power source for communicating power from the power source to the interface output port for enabling the user to selectively charge the electronic device via the interface output port.

2. The power interface ensemble of claim 1 wherein the port shroud comprises outer port shroud surfacing, the outer port shroud surfacing extending in an outer port shroud plane, the outer shroud plane extending obliquely relative to the exterior tool plane from the second exterior end to the first exterior end.

3. The power interface ensemble of claim 2 wherein the second exterior end and the outer shroud plane junction at a radiused formation.

4. The power interface ensemble of claim 3 wherein the first exterior end extends in a first port plane, the first port plane extending obliquely relative to the exterior tool plane.

5. The power interface ensemble of claim 4 wherein the second exterior end extends in a second port plane, the second port plane being orthogonal to the exterior tool plane.

6. The power interface ensemble of claim 5 wherein the at least one coupling shroud comprises inner coupling shroud surfacing, the inner coupling shroud surfacing comprising an inner coupling shroud plane, the inner coupling shroud plane extending obliquely relative to the tool-interface portion.

7. The power interface ensemble of claim 6 wherein the inner coupling shroud plane and the outer port shroud plane are non-parallel, the outer port shroud plane for directing matter away from the first exterior end, the inner coupling shroud plane for enhancing directed electrical communication between the interface output port and the power source.

8. The power interface ensemble of claim 7 wherein the inner coupling shroud plane and the interface output port are configured for enabling linear electrical communication between the interface output port and the at least one coupling shroud.

9. The power interface ensemble of claim 8 wherein the first exterior end comprises an interface input port for connecting to an external power source.

10. The power interface ensemble of claim 8 wherein the power interface module is electrically coupled to the internal power source by an internal cable, the internal cable being fixed to the power interface module via the coupling shroud and the internal power source.

11. The power interface ensemble of claim 10 wherein the internal power source includes a power source input port and a power source output port, the internal cable being adapted to connect the power interface module to the internal power source via the power source input port and the power source output port.

12. A power interface ensemble for enabling a user to selectively charge an electronic device, the power interface ensemble comprising:
    an article-carrying tool, the article carrying tool comprising an interface opening formed in an exterior tool plane of the article carrying tool; and
    a power interface module adapted to be electrically coupled to a power source, the power interface module comprising a tool-exterior module portion and a tool-interior module portion, the tool-exterior module portion comprising a first exterior end, a second exterior end opposite the first exterior end, and a port shroud extending intermediate the first and second exterior ends, the tool-interior module portion comprising a planar tool-interface portion and at least one coupling shroud;
    the tool-exterior module portion being dimensioned for receipt in the interface opening and attachable to the planar tool-interface portion such that the planar tool-interface portion and the exterior tool plane extend in parallel planes in juxtaposition relative to one another, the port shroud extending outwardly relative to the exterior tool plane, the coupling shroud extending inwardly relative to the planar tool-interface portion;
    the first exterior end comprising an interface output port for connecting to the electronic device, the interface output port being in electrical communication with the coupling shroud, the at least one coupling shroud being electrically communicable with the power source for communicating power from the power source to the interface output port for enabling the user to selectively charge the electronic device via the interface output port.

13. The power interface ensemble of claim 12 wherein the port shroud comprises outer port shroud surfacing, the outer port shroud surfacing extending in an outer port shroud plane, the outer port shroud plane extending obliquely relative to the exterior tool plane.

14. The power interface ensemble of claim 13 wherein the at least one coupling shroud comprises inner coupling shroud surfacing, the inner coupling shroud surfacing comprising an inner coupling shroud plane, the inner coupling shroud plane extending obliquely relative to the tool-interface portion.

15. The power interface ensemble of claim 14 wherein the inner coupling shroud plane and the outer port shroud plane are non-parallel, the outer port shroud plane for directing matter away from the first exterior end, the inner coupling shroud plane for enhancing directed electrical communication between the interface output port and the power source.

16. A power interface ensemble for enabling a user to selectively charge an electronic device, the power interface ensemble comprising:
    an article-carrying tool, the article carrying tool comprising an interface construction formed at an interface portion of the article-carrying tool, the interface construction coming a primary tool plane, an internal tool compartment, and an external tool device-positioning mechanism, the internal compartment and the external tool device-positioning mechanism being aligned on opposite sides of the primary tool plane; and
    an induction charger device, the induction charger device being received in the internal tool compartment and being in communication with a power source, the internal tool compartment being dimensioned for fixedly positioning the induction charger device adjacent the primary tool plane at a first charging position;
    the external tool device-positioning mechanism for positioning the electrical device at a second charging position opposite the first charging position and the primary tool plane, the induction charger device and power source thus for enabling the user to selectively charge the electrical device via the primary tool plane.

17. The power interface ensemble of claim 16 wherein the article carrying tool comprises an interface opening formed in an exterior tool plane of the article carrying tool, the power interface ensemble further comprising:
    a power interface module adapted to be electrically coupled to the power source, the power interface module comprising a tool-exterior module portion and a tool-interior module portion, the tool-exterior module portion comprising a first exterior end, a second exterior end, and a port shroud extending intermediate the first and second exterior ends, the tool-interior module portion comprising a planar tool-interface portion and at least one coupling shroud;
    the tool-exterior module portion being dimensioned for receipt in the interface opening and attachable to the planar tool-interface portion such that the planar tool-interface portion and the exterior tool plane extend in parallel planes in juxtaposition relative to one another, the port shroud extending outwardly relative to the exterior tool plane, the at least one coupling shroud extending inwardly relative to the planar tool-interface portion;
    the first exterior end comprising an interface output port for connecting to the electronic device, the interface output port being in electrical communication with the at least one coupling shroud, the at least one coupling shroud being electrically communicable with the power source for communicating power from the power source to the interface output port for enabling the user to selectively charge the electronic device via the interface output port.

18. The power interface ensemble of claim 17 wherein the port shroud comprises outer port shroud surfacing, the outer port shroud surfacing extending in an outer port shroud plane, the outer port shroud plane extending obliquely relative to the exterior tool plane.

19. The power interface ensemble of claim 18 wherein the at least one coupling shroud comprises inner coupling shroud surfacing, the inner coupling shroud surfacing comprising an inner coupling shroud plane, the inner coupling shroud plane extending obliquely relative to the tool-interface portion.

20. The power interface ensemble of claim 19 wherein the inner coupling shroud plane and the outer port shroud plane are non-parallel, the outer port shroud plane for directing matter away from the first exterior end, the inner coupling shroud plane for enhancing directed electrical communication between the interface output port and the power source.

* * * * *